(12) United States Patent
Heismann

(10) Patent No.: US 10,218,436 B2
(45) Date of Patent: Feb. 26, 2019

(54) DETERMINING IN-BAND OPTICAL SIGNAL-TO-NOISE RATIO IN POLARIZATION-MULTIPLEXED OPTICAL SIGNALS USING SIGNAL CORRELATIONS

(71) Applicant: VIAVI SOLUTIONS INC., Milpitas, CA (US)

(72) Inventor: Fred L. Heismann, Colts Neck, NJ (US)

(73) Assignee: VIAVI SOLUTIONS INC., Milpitas, CA (US)

( * ) Notice: Subject to any disclaimer, the term of this patent is extended or adjusted under 35 U.S.C. 154(b) by 0 days.

(21) Appl. No.: 15/787,515

(22) Filed: Oct. 18, 2017

(65) Prior Publication Data

US 2018/0138974 A1    May 17, 2018

Related U.S. Application Data

(62) Division of application No. 14/564,580, filed on Dec. 9, 2014, now Pat. No. 9,825,698.

(51) Int. Cl.
*H04B 10/079* (2013.01)

(52) U.S. Cl.
CPC . *H04B 10/07953* (2013.01); *H04B 10/07951* (2013.01); *H04B 10/07955* (2013.01)

(58) Field of Classification Search
CPC ........ H04B 10/07953; H04B 10/07951; H04B 10/07955
See application file for complete search history.

(56) References Cited

U.S. PATENT DOCUMENTS

| 6,813,021 | B2 | 11/2004 | Chung et al. |
| 7,106,443 | B2 | 9/2006 | Wein et al. |
| 7,149,428 | B2 | 12/2006 | Chung et al. |
| 8,655,170 | B2 | 2/2014 | Shukunami et al. |
| 2003/0202795 | A1* | 10/2003 | Garcia ............. H04B 10/077 398/147 |
| 2010/0111530 | A1* | 5/2010 | Shen ............. H04B 10/2572 398/65 |
| 2012/0170929 | A1 | 7/2012 | Xie et al. |
| 2014/0071436 | A1* | 3/2014 | Cyr ............. G01N 21/21 356/73.1 |

(Continued)

FOREIGN PATENT DOCUMENTS

| EP | 2309663 A1 | 4/2011 |
| EP | 2393223 A1 | 12/2011 |

OTHER PUBLICATIONS

Wolfgang Grupp, et al: "In-band OSNR Measurement based on Spectral Correlation", May 3, 2010, 4 pages.

(Continued)

*Primary Examiner* — Leslie C Pascal
(74) *Attorney, Agent, or Firm* — Mannava & Kang, P.C.

(57) ABSTRACT

A method and apparatus for determining in-band OSNR in optical information signals, e.g. in polarization-multiplexed QPSK and higher-order M-ary QAM signals, are disclosed. A correlation measurement of the signal amplitude or power at two distinct optical frequencies of the signal may be used to determine the in-band optical noise in the signal. A measurement of the signal power may be used to determine the OSNR based on the determined in-band noise.

8 Claims, 22 Drawing Sheets

(56) References Cited

U.S. PATENT DOCUMENTS

2015/0155935 A1 6/2015 Oda et al.
2015/0341138 A1 11/2015 Ishihara et al.

OTHER PUBLICATIONS

International Electrotechnical Commission Standards Document "Digital systems—Optical signal-to-noise ration measurements for dense wavelength-division multiplexed systems," IEC 61280-2-9, 2009.
"Optical signal-to-Noise Ratio Measurement in WDM Networks Using Polarization Extinction" by M. Rasztovits-Wiech et al., European Conference on Optical Communication, Sep. 20-24, 1998, Madrid Spain, pp. 549-550.
X. Liu et al. in "OSNR monitoring method for OOK and DPSK based on optical delay interferometer," Photon. Technol. Lett., vol. 19, p. 1172 (2007).
W. Chen et al. in "Optical signal-to-noise ratio monitoring using uncorrelated beat noise," Photon. Technol. Lett., vol. 17, p. 2484 (2005).
M. Bakaul in "Low-cost PMD-insensitive and dispersion tolerant in-band OSNR monitor based on uncorrelated beat noise measurement," Photon. Technol. Lett., vol. 20, p. 906 (2008).
T. Saida et al. in "In-band OSNR monitor with high-speed integrated Stokes polarimeter for polarization division multiplexed signal," Opt. Express, vol. 20, p. B165 (2012).
D. J. Ives et al. in "Estimating OSNR of equalised QPSK signals," ECOC 2011 Technical Digest, paper Tu.6.A.6 (2011).
R. Schmogrow et al. in "Error vector magnitude as a performance measure for advanced modulation formats," Photon. Technol. Lett., vol. 24, p. 61 (2012).
H. Y. Choi et al., "OSNR monitoring technique for PDM-QPSK signals based on asynchronous delay-tap sampling technique," OFC 2010 Technical Digest, Paper JThA16.
H. H. Choi et al. In "A Simple OSNR Monitoring Technique Based on RF Spectrum Analysis for PDM-QPSK Signals," OECC 2012 Technical Digest (Korea), Paper 6B3-4.
D. Gariepy et al. In "Non-intrusive measurement ofin-band OSNR of high bit-rate polarization-multiplexed signals," Opt. Fiber Technol. vol. 17, p. 518-522 (2011).
W. A. Gardner et al., "Spectral correlation of modulated signals: Part II—Digital modulation", IEEE Transaction on Communications vol. COM-35, p. 595 (1987).
W. A. Gardner, "Cyclic Wiener filtering: Theory and method", IEEE Transaction on Communications vol. 41, p. 151 (1993).
J. W. Goodman, Statistical Optics (John Wiley and Sons, New York 1985).
M.V. Ionescu et al., "In-band OSNR Estimation for Nyquist WDM Superchannels" ECOC 2014, Cannes—France p. 4.16.

\* cited by examiner

DETERMINING IN-BAND OPTICAL SIGNAL-TO-NOISE RATIO IN POLARIZATION-MULTIPLEXED OPTICAL SIGNALS USING SIGNAL CORRELATIONS

PRIORITY

This application is a Divisional of commonly assigned and co-pending U.S. patent application Ser. No. 14/564,580, filed Dec. 9, 2014, the disclosure of which is hereby incorporated by reference in its entirety.

TECHNICAL FIELD

The present disclosure relates to optical test and measurement, and in particular to determination of optical signal-to-noise ratio and other signal quality parameters.

BACKGROUND

The quality of modulated optical signals transmitted in long-distance fiberoptic communication systems is frequently characterized by optical signal-to-noise ratio (OSNR), which defines a ratio of the total optical power of the digital information signal to optical noise added to the signal by optical amplifiers. In communication systems with only a few widely-spaced wavelength-multiplexed signals, OSNR may be readily determined by spectral analysis of a transmitted noisy signal and the optical noise floor on either side of the signal spectrum. By way of example, International Electrotechnical Commission Standards Document "Digital systems—Optical signal-to-noise ration measurements for dense wavelength-division multiplexed systems," IEC 61280-2-9, 2009, describes such an OSNR measurement.

In modern optical communication systems with dense wavelength-division multiplexing (DWDM), various transmitted optical signals are closely spaced in optical frequency, so that it becomes difficult to measure optical noise floor between adjacent signal spectra. This is of a particular concern for communication systems transmitting optical signals at bit rates of 100 Gb/s over 50-GHz wide wavelength channels. In these systems, one needs to measure the optical noise floor within the spectral bandwidth of the signal to determine the signal's OSNR. Such measurements are commonly referred to as in-band OSNR measurements. Furthermore, it is frequently required that these in-band OSNR measurements are performed while the communication system is in service, i.e. that the noise floor within the signal's bandwidth is determined while the optical information signal is transmitted.

Several methods have been disclosed to measure an in-band OSNR in presence of transmitted signals. For conventional single-polarized optical information signals (e.g. for 10 Gb/s NRZ-OOK signals), a polarization nulling technique has been disclosed. Polarization nulling substantially removes the polarized signal from the received noisy signal, thus revealing the floor of an unpolarized optical noise in the spectral bandwidth of the signal. Such a technique has been described in "Optical signal-to-Noise Ratio Measurement in WDM Networks Using Polarization Extinction" by M. Rasztovits-Wiech et al., European Conference on Optical Communication, 20-24 Sep. 1998, Madrid Spain, pp. 549-550.

Modern optical information signals are frequently composed of two mutually orthogonally polarized optical carriers at a same optical frequency. The carriers are independently modulated with digital information data. This polarization multiplexing technique is frequently used in long-distance communication systems to transmit 50 Gb/s BPSK, 100 Gb/s QPSK, or 200 Gb/s 16-QAM signals over 50-GHz wide DWDM channels. In polarization-multiplexed (PM) signals, in-band OSNR cannot be determined by means of the above-referenced polarization-nulling technique, because the two orthogonally polarized optical carriers cannot be simultaneously removed from the noisy optical signal without also extinguishing the optical noise.

While several methods have been disclosed to measure in-band OSNR in polarization-multiplexed signals, they generally only work with optical signals of a predetermined bit-rate, modulation format, and/or signal waveform. Consequently, these methods may be suitable for monitoring of in-band OSNR at certain points in a communication system, e.g. by means of built-in monitoring equipment, but are difficult to use as a general test and measurement procedure. Furthermore, some of these methods are not suitable for determining in-band OSNR in signals substantially distorted by chromatic dispersion (CD) or polarization-mode dispersion (PMD).

By way of example, a method for in-band OSNR measurements, that only works with binary PSK and ASK signals, has been disclosed by X. Liu et al. in "OSNR monitoring method for OOK and DPSK based on optical delay interferometer," Photon. Technol. Lett., Vol. 19, p. 1172 (2007), as well as by W. Chen et al. in "Optical signal-to-noise ratio monitoring using uncorrelated beat noise," Photon. Technol. Lett., Vol. 17, p. 2484 (2005), and M. Bakaul in "Low-cost PMD-insensitive and dispersion tolerant in-band OSNR monitor based on uncorrelated beat noise measurement," Photon. Technol. Lett., Vol. 20, p. 906 (2008). This method does not work with 100 Gb/s PM-QPSK or 200 Gb/s PM-16-QAM signals.

Other methods for in-band OSNR monitoring of polarization-multiplexed signals are based on coherent detection with high-speed receivers and subsequent digital signal processing. These methods typically operate at a predetermined bit-rate. One of these methods, disclosed by T. Saida et al. in "In-band OSNR monitor with high-speed integrated Stokes polarimeter for polarization division multiplexed signal," Opt. Express, Vol. 20, p. B165 (2012), determines the in-band OSNR from the spread of the four polarization states through which an optical PM QPSK signal cycles rapidly. Clearly, such high-speed polarization analysis requires prior knowledge of the modulation format and the bit-rate of the transmitted signal and, furthermore, is very sensitive to signal distortions caused by chromatic dispersion (CD) and polarization mode dispersion (PMD).

For applications in long-distance communication systems, it may be advantageous to remove CD- and PMD-induced signal distortions prior to determining OSNR. Compensation of signal distortions introduced by CD and PMD may be accomplished electronically in a high-speed digital signal processor 10, which is shown schematically in FIG. 1. In FIG. 1, wavelength-division multiplexed (WDM) signals 11 are coupled to a first polarization beamsplitter (PBS) 12a, and a local oscillator (LO) laser 13 is coupled to a second PBS 12b. The split optical signals are mixed in 90° hybrid mixers 14, converted into electrical signals by photodetectors 15, and digitized by analog-to-digital converters (ADCs) 16. The digital signal processor 10 performs CD compensation 17, PMD compensation 18, and phase recovery 19. Finally, the OSNR is computed at 10a.

The digital compensation has a disadvantage in that it requires the high-speed ADCs 16, which usually have only a relatively small dynamic range (typically less than 16 dB), thus limiting the OSNR measurement range. In-band OSNR measurement methods employing error vector magnitude (EVM) analysis of the received signal after electronic compensation of CD and PMD have been disclosed by D. J. Ives et al. in "Estimating OSNR of equalised QPSK signals," *ECOC* 2011 *Technical Digest*, paper Tu.6.A.6 (2011) and by R. Schmogrow et al. in "Error vector magnitude as a performance measure for advanced modulation formats," *Photon. Technol. Lett.*, Vol. 24, p. 61 (2012), as well as by H. Y. Choi et al., "OSNR monitoring technique for PDM-QPSK signals based on asynchronous delay-tap sampling technique," *OFC* 2010 *Technical Digest*, Paper JThA16. EVM analysis intrinsically requires foreknowledge of the particular modulation format of the optical signal.

Another method for OSNR monitoring is based on RF spectral analysis of low-speed intensity variations of polarization-multiplexed signals. This method has been disclosed by H. H. Choi et al. in "A Simple OSNR Monitoring Technique Based on RF Spectrum Analysis for PDM-QPSK Signals," *OECC* 2012 *Technical Digest* (Korea), Paper 6B3-4. However, this method is very sensitive to variations in the signal's waveform. Hence, it requires not only foreknowledge of the modulation format and bit-rate of the analyzed optical signal, but also careful calibration with a noiseless signal.

A method for in-band OSNR measurements using conventional spectral analysis of the optical signal power has been disclosed by D. Gariépy et al. in "Non-intrusive measurement of in-band OSNR of high bit-rate polarization-multiplexed signals," *Opt. Fiber Technol*. vol. 17, p. 518 (2011). A disadvantage of this method is that it only works with signals whose optical spectrum is substantially narrower than the spectral width of the DWDM channel, e.g. it works with 40 Gb/s PM NRZ-QPSK signals transmitted through 50-GHz wide DWDM channels, but usually not with 100 Gb/s PM RZ-QPSK signals transmitted through 50-GHz wide DWDM channels.

Yet another method for in-band OSNR measurements in polarization-multiplexed signals has been disclosed by W. Grupp in European Patent EP 2,393,223 "In-band SNR measurement based on spectral correlation," issued Dec. 7, 2011. This method determines in-band OSNR from measurements of the cyclic autocorrelation function of the signal amplitude, i.e. by calculating noiseless signal power from correlations between spectral components of the Fourier transform of the cyclic autocorrelation function. The cyclic autocorrelation function of the signal's amplitude may be measured, for example, by means of two parallel coherent receivers employing a common pulsed local oscillator laser, as shown schematically in FIG. 2. A pulsed laser 20 is triggered by a clock recovery circuit 21, which receives light via a tap 21*a* coupled to a 3 dB splitter 22. Electrical signals of the photodetectors 15 are filtered by low-pass filters 23. A variable optical delay 24 is employed to sample the optical signal 11 twice within each symbol period at various times and with various differential delays between the two samples taken within the same symbol period. A processor 25 is used to calculate the OSNR. This method also requires foreknowledge of the modulation format and bit-rate of the optical signal, as well as careful calibration of the apparatus with a noiseless signal. In addition, the method is very sensitive to signal distortions introduced by CD and/or PMD.

SUMMARY

According to one aspect of the disclosure, there is provided a method and apparatus for in-service determination of in-band OSNR in polarization-multiplexed, as well as single-polarized signals of unknown bitrate and modulation format. The method may allow accurate determination of the in-band OSNR not only in binary ASK and PSK encoded signals, but also in conventional QPSK and M-ary QAM signals. It is relatively insensitive to large CD- or PMD-induced signal distortions, and does not require prior calibration with a similar noiseless optical signal.

These highly desirable features may be accomplished by first measuring an optical power spectrum of a noisy signal, e.g. by means of a conventional optical spectrum analyzer, and by subsequently measuring correlations between predetermined pairs of spaced apart time-varying frequency components in the optical amplitude or power/intensity spectrum of the signal by means of two optically narrow-band amplitude or power detectors. The power detectors may include narrow-band coherent receivers with phase and polarization diversity. The coherent receivers may include continuous wave (cw), not pulsed laser(s) as local oscillator(s) (LO).

In accordance with an embodiment of the disclosure, there is provided a method for determining an optical signal-to-noise ratio of a modulated optical signal propagating in a transmission link, the modulated optical signal comprising a plurality of wavelength channels, the method comprising:

(a) measuring an optical power spectrum of the modulated optical signal, the optical power spectrum comprising at least one of the plurality of wavelength channels;

(b) measuring a time-varying parameter comprising at least one of: time-varying optical signal amplitudes and phases in two mutually orthogonal polarization states; and time-varying optical signal power levels in two mutually orthogonal polarization states; wherein the time-varying parameter is measured simultaneously at first and second predetermined optical frequencies in a selected one of the plurality of wavelength channels, wherein the first and second predetermined optical frequencies are separated by a non-zero frequency interval;

(c) determining a correlation between the time-varying parameters measured in step (b) at the first and second optical frequencies by calculating a correlation coefficient between the time-varying parameters at the first and second optical frequencies; and (d) determining the optical signal-to-noise ratio from the optical power spectrum measured in step (a) and the correlation coefficient calculated in step (c).

In accordance with an aspect of the disclosure, there is provided a method for determining a group velocity dispersion accumulated due to chromatic dispersion of a modulated optical signal comprising a plurality of wavelength channels, the method comprising:

(a) measuring time-varying amplitudes and phases of the modulated optical signal in two mutually orthogonal polarization states simultaneously at first and second predetermined optical frequencies separated by a non-zero frequency interval, in at least one of the plurality of wavelength channels;

(b) introducing a differential time and phase delay between signals representing the time-varying optical signal amplitudes and phases at the first and second optical frequencies;

(c) determining a correlation between the time-varying optical signal amplitudes and phases at the predetermined optical frequencies by calculating a correlation coefficient between the time-varying amplitudes and phases of the modulated optical signal; and (d) varying the differential time and phase delay of step (b);

(e) repeating steps (c) and (d) until the correlation coefficient reaches a maximum; and (f) calculating the group velocity dispersion from the differential time and phase delay introduced in step (b) and varied in step (d), and the frequency interval of step (a).

In accordance with an aspect of the disclosure, there is provided a method for determining a differential group delay accumulated due to polarization mode dispersion of a modulated optical signal comprising a plurality of wavelength channels, the method comprising:

(a) measuring time-varying optical signal power of the modulated optical signal in two mutually orthogonal polarization states simultaneously at first and second predetermined optical frequencies separated by a non-zero frequency interval, in at least one of the plurality of wavelength channels;

(b) introducing a differential group delay between signals representing the time-varying optical signal powers at the first and second optical frequencies;

(c) determining a correlation between the time-varying optical signal powers at the first and second optical frequencies by calculating a correlation coefficient between the time-varying optical signal powers; and (d) varying the differential group delay of step (b);

(e) repeating steps (c) and (d) until the correlation coefficient reaches a maximum;

(f) using the last value of the differential group delay varied in step (d) to obtain the differential group delay accumulated due to polarization mode dispersion of the modulated optical signal.

In accordance with an aspect of the disclosure, there is provided an apparatus for determining an optical signal-to-noise ratio of a modulated optical signal comprising a plurality of wavelength channels, the apparatus comprising:

a spectrum analyzer for measuring an optical power spectrum of the modulated optical signal, the optical power spectrum comprising at least one of the plurality of wavelength channels;

a frequency selective splitter for selecting first and second portions of the modulated optical signal at first and second predetermined optical frequencies, respectively, in a selected one of the plurality of wavelength channels, wherein the first and second predetermined optical frequencies are separated by a non-zero frequency interval;

a measuring unit for measuring a time-varying parameter comprising at least one of: time-varying optical amplitudes and phases; and time-varying optical power levels of the first and second portions of the modulated optical signal;

a signal processor for determining a correlation between the time-varying parameters of the first and second portions of the modulated optical signal, and for calculating the optical signal-to-noise-ratio from the correlation of the time-varying parameters and the power spectrum of the modulated optical signal.

In embodiments where the time-varying parameter includes the time-varying optical signal amplitudes and phases, the amplitude and phase detector may include a coherent receiver, and the frequency selector may include a tunable local oscillator light source, e.g. a narrowband cw laser source.

BRIEF DESCRIPTION OF THE DRAWINGS

Exemplary embodiments will now be described in conjunction with the drawings, in which.

DETAILED DESCRIPTION

Figure 1:
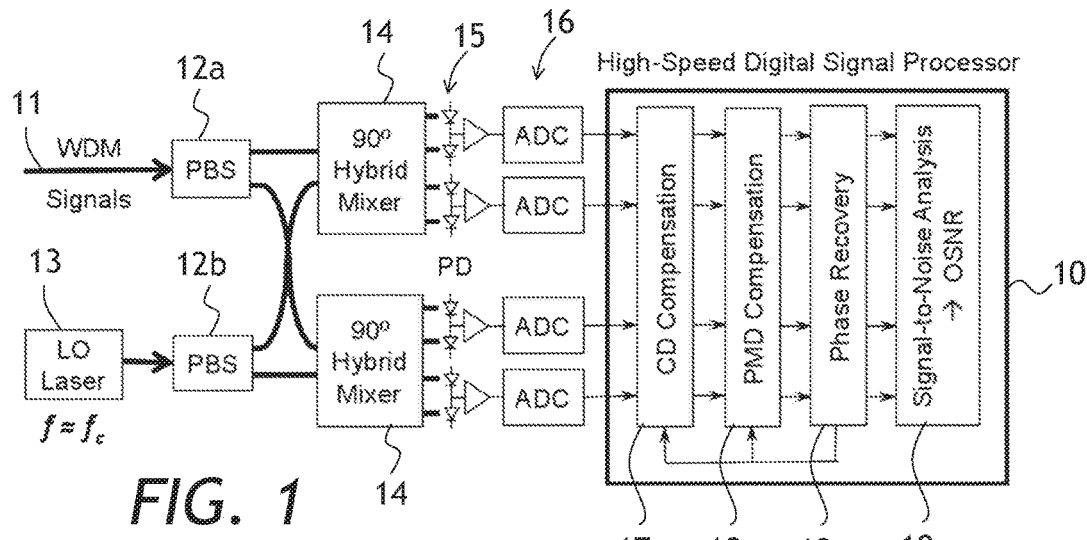
FIG. 1 is a schematic illustration of a prior-art apparatus for measuring in-band OSNR using a high-speed coherent receiver and a digital signal processor.
Figure 2:
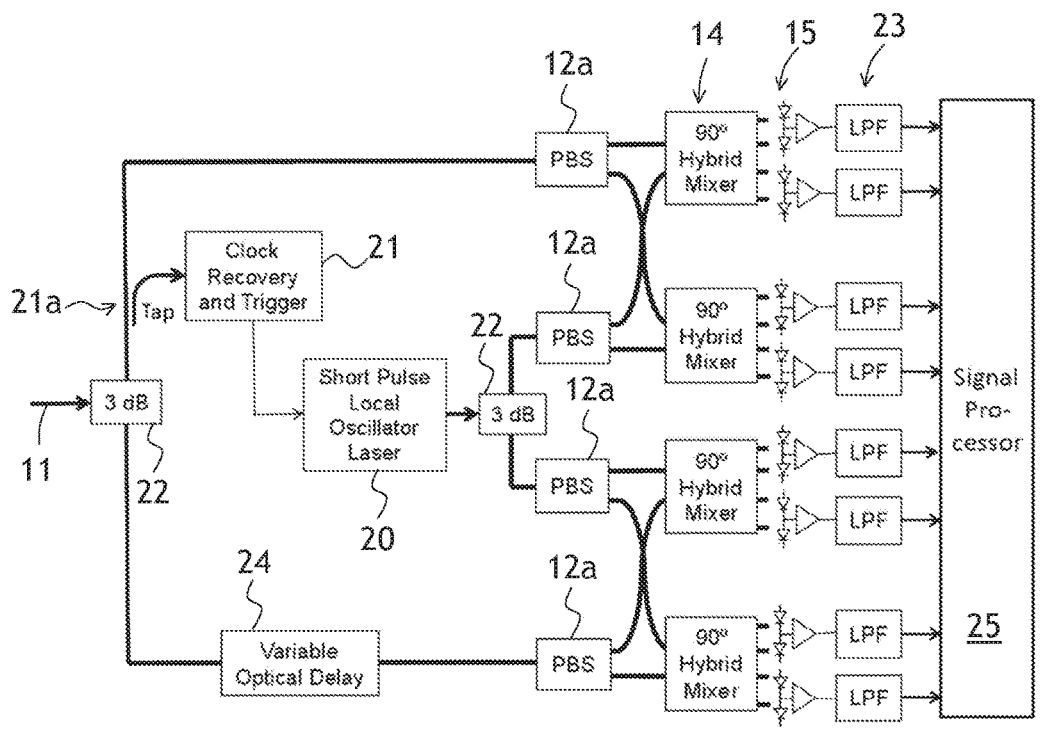
FIG. 2 is a schematic illustration of a prior-art apparatus for measuring in-band OSNR by means of high-speed optical sampling of the signal amplitude with two parallel coherent receivers employing a pulsed local oscillator laser at a single optical frequency.

While the present teachings are described in conjunction with various embodiments and examples, it is not intended that the present teachings be limited to such embodiments. On the contrary, the present teachings encompass various alternatives and equivalents, as will be appreciated by those of skill in the art.

Amplitude and phase of digitally modulated optical signals, such as QPSK- and 16-QAM-modulated signals, may vary pseudo-randomly with time. These pseudo-random amplitude and phase variations are difficult to distinguish from random amplitude and phase variations of optical ASE noise generated by optical amplifiers, in particular if the waveform of the modulated signal is substantially distorted by large amounts of chromatic dispersion or polarization-mode dispersion in the fiber link. However, an autocorrelation function of digitally modulated signals is periodic in time, because the transmitted symbols are assigned predetermined and substantially equal time intervals, whereas the autocorrelation function of random ASE noise does not exhibit such periodicity. The periodicity of the autocorrelation function of digitally modulated signals is manifested in the signal's optical frequency spectrum, which exhibits strong correlations between time-varying amplitudes, and also between time-varying intensities and optical power levels, of certain pairs of spaced apart spectral components, whereas such correlations do not exist in the optical spectrum of random ASE noise. It is possible, therefore, to determine a relative amount of random ASE noise in a transmitted modulated signal by measuring correlations between the aforementioned spaced apart spectral components, and by subsequently comparing the measured correlations to corresponding correlations in a noiseless signal spectrum. Once the relative amount of ASE noise in a transmitted signals is determined, the in-band OSNR of the noisy signal may be calculated.

Correlations between various spectral components of a digitally modulated signal may be described by a spectral correlation density function (SCDF), $S_x^\alpha(f)$, which is defined as the Fourier transformation of the cyclic autocorrelation function, $R_x^\alpha(\tau)$, of the optical signal amplitude x(t), i.e.

$$S_x^\alpha(f) \equiv \int_{-\infty}^{\infty} R_x^\alpha(\tau) \cdot \exp(-j2\pi f\tau) d\tau$$

wherein $R_x^\alpha(\tau)$ is the cyclic auto-correlation function given by $$R_x^\alpha(\tau) \equiv \langle x(t+\tau/2) \cdot x^*(t-\tau/2) \cdot \exp(-j2\pi\alpha t) \rangle,$$

and x(t) is a time-varying complex two-dimensional Jones vector, which describes amplitude and phase variations of the two polarization components of the modulated signal as a function of time t. The brackets < > denote time averaging over a time period that is substantially longer than the symbol period $T_{symbol}$ of the digital modulation. More generally, the averaging period, and accordingly the measurements of spectral components amplitudes, phases, and/or optical power levels/intensities, should be sufficiently long to ensure a pre-determined level of fidelity of computed correlations.

Equivalently, the SCDF may be expressed as a correlation function of the time-varying amplitudes of the spectral components of the modulated signal, i.e. as $$S_x^\alpha(f) = \langle X_T(t, f+\alpha/2) \cdot X_T^*(t, f-\alpha/2) \rangle$$

wherein $$X_T(t, v) = \int_{t-T/2}^{t+T/2} x(u) \cdot \exp(-j2\pi vu) du$$

and T is an integration time with $T \gg T_{symbol}$. The brackets in the above expression denote averaging over a time period substantially longer than the integration time T. For methods disclosed herein, it may be advantageous to define a normalized SCDF of the spectral correlations, i.e.

$$\hat{S}_x^\alpha(f) = \frac{\langle X_T(t, f+\alpha/2) \cdot X_T^*(t, f-\alpha/2) \rangle}{\sqrt{\langle |X_T(t, f+\alpha/2)|^2 \rangle} \sqrt{\langle |X_T(t, f-\alpha/2)|^2 \rangle}},$$

which is similar to the un-balanced correlation coefficient used in statistical analysis, and which has the property $-1 \leq \hat{S}_x^\alpha(f) \leq 1$ for all values of f and α.

It is known that noiseless and otherwise undistorted optical signals encoded with binary amplitude-shift keying (ASK), binary phase-shift keying (BPSK), ordinary quaternary phase-shift keying (QPSK), and 16-quadrature-amplitude modulation (16-QAM) exhibit $\hat{S}_x^\alpha(f)=1$ when $\alpha=\alpha_0=1/T_{symbol}$ and for all frequencies f within the range $-\alpha/2<f<-\alpha/2$. In addition, it is known that $\hat{S}_x^\alpha(f)=1$ when $\alpha=2/T_{symbol}$. However, it is important to note that for optical signals encoded with staggered QPSK modulation, also referred to as "offset QPSK", $\hat{S}_x^\alpha(f) \approx 0$ when $\alpha=1/T_{symbol}$. For staggered QPSK $\hat{S}_x^\alpha(f)=1$ only when $\alpha=2/T_{symbol}$.

In contrast to modulated optical signals, optical ASE noise is a random Gaussian process and, therefore, does not exhibit any significant correlation between its spectral components. Therefore, when random ASE noise is added to a modulated optical signal, the normalized SCDF is always smaller than unity, i.e. $S_x^\alpha(f) < 1$, as described below in more detail. Let n(t) denote the Jones vector of the phase and amplitude of random ASE noise added to the transmitted signal, then the Jones vector $\tilde{X}_T(t,v)$ of the spectral component of the noisy signal at frequency v is the sum of the noiseless Jones vector $X_T(t,v)$, defined above, and the corresponding Jones vector of the ASE noise $N_T(t,v)$, i.e.

$$\tilde{X}_T(t, v) = \int_{t-T/2}^{t+T/2} (x(u) + n(u)) \cdot \exp(-j2\pi v u) du \equiv X_T(t, v) + N_T(t, v).$$

Consequently, the SCDF of a noisy modulated signal can be expressed as $$S_x^{\alpha(f)} = \langle \tilde{X}_T(t, f+\alpha/2) \cdot \tilde{X}_T^*(t, f-\alpha/2) \rangle$$
$$= \langle X_T(t, f+\alpha/2) \cdot X_T^*(t, f-\alpha/2) \rangle +$$
$$\langle N_T(t, f+\alpha/2) \cdot N_T^*(t, f-\alpha/2) \rangle$$

wherein the second term on the right side of the equation vanishes when $|\alpha| > 0$. It should be noted that $$\langle X_T(t,f+\alpha/2) \cdot N_T^*(t,f-\alpha/2) \rangle =$$
$$\langle X_T(t,f+\alpha/2) \cdot N_T^*(t,f-\alpha/2) \rangle \equiv 0,$$

because the amplitudes of random noise and modulated signal are uncorrelated. Thus, the normalized SCDF for $\alpha > 0$, e.g. for $\alpha = 1/T_{symbol}$, is given by $$\hat{S}_x^\alpha(f) = \frac{\langle X_T(t, f+\alpha/2) \cdot X_T^*(t, f-\alpha/2) \rangle}{\sqrt{\langle |X_T(t, f+\alpha/2)|^2 + |N_T(t, f+\alpha/2)|^2 \rangle}\sqrt{\langle |X_T(t, f-\alpha/2)|^2 + |N_T(t, f-\alpha/2)|^2 \rangle}}$$

Assuming that the power spectrum of the modulated signal is symmetric about its carrier frequency $f_c$, which is generally the case for the aforementioned modulation formats, so that $$\langle |X_T(t,f_c+\alpha/2)|^2 \rangle = \langle |X_T(t,f_c-\alpha/2)|^2 \rangle \equiv \langle P_S(f_c \pm \alpha/2) \rangle,$$

and further assuming that the power spectrum of the random ASE also is substantially symmetric about $f_c$, which is frequently the case, so that $$\langle |N_T(t,f+\alpha/2)|^2 \rangle = \langle |N_T(t,f-\alpha/2)|^2 \rangle \equiv \langle P_N(f_c \pm \alpha/2) \rangle,$$

then the normalized SCDF at difference frequency $\alpha_0 = 1/T_{symbol}$ can be expressed as $$\hat{S}_x^{\alpha_0}(f_c) = \frac{\langle P_S(f_c \pm \alpha_0/2) \rangle}{\langle P_S(f_c \pm \alpha_0/2) \rangle + \langle P_N(f_c \pm \alpha_0/2) \rangle},$$

which—after rearrangement—yields the signal-to-noise ratio, SNR, of the spectral components at the two optical frequencies $f_c - \alpha_0/2$ and $f_c + \alpha_0/2$ as $$SNR(f_c, \alpha_0) = \frac{\langle P_S(f_c \pm \alpha_0/2) \rangle}{\langle P_N(f_c \pm \alpha_0/2) \rangle} = \frac{\hat{S}_x^{\alpha_0}(f_c)}{1 - \hat{S}_x^{\alpha_0}(f_c)},$$

and, similarly, the ratio of the total signal and noise power to the noise power at $f_c \pm \alpha_0/2$ as $$\frac{\langle P_S(f_c \pm \alpha_0/2) + P_N(f_c \pm \alpha_0/2) \rangle}{\langle P_N(f_c \pm \alpha_0/2) \rangle} = \frac{1}{1 - \hat{S}_x^{\alpha_0}(f_c)}.$$

It is known to those skilled in the art that the OSNR of a transmitted signal is defined as the ratio of the total signal power over the total noise power in an optical bandwidth $B_{noise}$ (usually equal to 0.1 nm; c.f. IEC 61280-2-9 "Digital systems—Optical signal-to-noise ratio measurements for dense wavelength-division multiplexed systems") as $$OSNR \equiv \frac{\sum_i \langle P_S(f_i) \rangle B_{meas}}{\langle P_N \rangle B_{noise}} = \frac{\sum_i \langle P_S(f_i) + P_N \rangle B_{meas}}{\langle P_N \rangle B_{noise}} - \sum_i \frac{B_{meas}}{B_{noise}},$$

wherein the summation extends over all frequency components $f_i$ within the bandwidth of the signal, and $B_{meas}$ denotes the measurement bandwidth of each power measurement $\langle P_S(f_i) \rangle$ and $\langle P_N(f_i) \rangle$. It should be noted that the above definition of OSNR assumes that the spectrum of the random ASE noise is substantially flat within the bandwidth of the modulated signal, so that the average noise power density is identical at all frequencies, i.e. $\langle P_N(f_i) \rangle = \langle P_N(f_j) \rangle = \langle P_N \rangle$ for all frequencies $f_i \neq f_j$ within the bandwidth of the modulated optical signal. The in-band OSNR of a noisy signal may thus be determined from a measurement of the power spectrum of the transmitted noisy signal, i.e. of $\langle P_S(f) \rangle + \langle P_N(f) \rangle$, and an additional measurement of the average noise power, $\langle P_N(f) \rangle$, within the bandwidth of the modulated signal.

Whereas conventional single-polarized signals $\langle P_N \rangle$ may be directly measured by blocking the polarized signal with a properly oriented polarization filter, such measurements cannot be performed with polarization-multiplexed signals. In the present disclosure, $\langle P_N \rangle$ may be obtained from the spectral correlation of the complex Jones vectors of the signal amplitudes at optical frequencies $f_c - \alpha_0/2$ and $f_c + \alpha_0/2$, as described above, and expressed as a fraction of the noisy signal power at these frequencies, i.e. as $$\langle P_N \rangle = \langle P_S(f_c \pm \alpha_0/2) + P_N \rangle [1 - \hat{S}_x^{\alpha_0}(f_c)].$$

It should be noted that this procedure can be applied to polarization-multiplexed signals, as well as to single-polarized signals. Substituting the above relation into the equation for OSNR immediately yields the desired in-band OSNR if the optical signal, $$OSNR = \frac{\sum_i \langle P_S(f_i) + P_N \rangle B_{meas}}{\langle P_S(f_c \pm \alpha_0/2) + P_N \rangle B_{noise}} \cdot \frac{1}{1 - \hat{S}_x^{\alpha_0}(f_c)} - \sum_i \frac{B_{meas}}{B_{noise}}$$

$$= \frac{\sum_i \{\langle P_S(f_i) + P_N \rangle - \langle P_S(f_c \pm \alpha_0/2) + P_N \rangle [1 - \hat{S}_x^{\alpha_0}(f_c)]\} B_{meas}}{\langle P_S(f_c \pm \alpha_0/2) + P_N \rangle [1 - \hat{S}_x^{\alpha_0}(f_c)] B_{noise}},$$

wherein all quantities are known from the two measurements described above.

Figure 3:
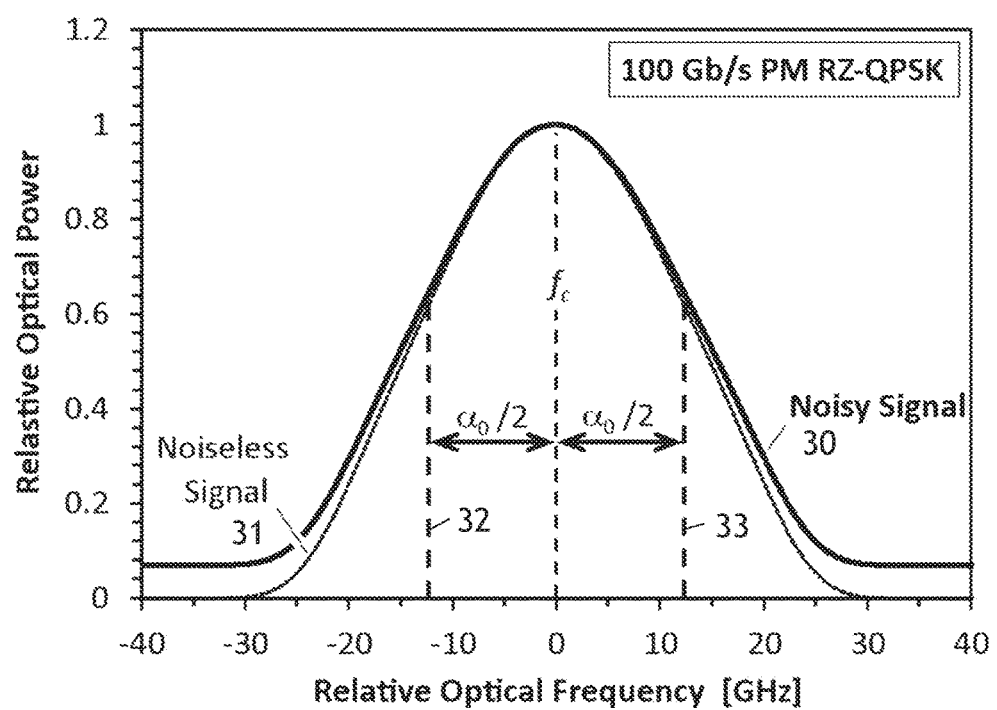
FIG. 3 illustrates a plot of an optical power spectrum of a noisy 100 Gb/s polarization-multiplexed RZ-QPSK signal, showing spectral components used for measuring the correlation coefficients at two spaced apart optical frequencies.

Therefore, the in-band OSNR of a transmitted noisy signal may be determined from a measurement of the spectral correlation of the optical amplitudes at frequencies $f_c \pm \alpha_0/2$ and a conventional spectral analysis of the combined signal and noise power, as shown in the example of FIG. 3 for a 100 Gb/s PM-QPSK noisy signal 30 compared with a noiseless signal 31. Spectral components 32 and 33 may be used for measuring the correlation coefficients at optical frequencies $f_c - \alpha_0/2$ and $f_c + \alpha_0/2$. The spectral components 32 and 33 are preferably selected so that differences between each of optical frequencies of the spectral components 32 and 33 and the carrier frequency $f_c$ of the modulated optical signal in the selected wavelength channel are substantially of equal magnitude $\alpha_0/2$, so that the frequency interval is substantially equal to the symbol repetition frequency, or an integer multiple of the symbol repetition frequency. More generally, any two predetermined optical frequencies in a selected one of the plurality of wavelength channels may be used, provided that the optical frequencies are separated by a non-zero frequency interval.

The above described method does not require foreknowledge of the time-varying waveform or the particular modulation format of the transmitted optical signal. Therefore, determination of the in-band OSNR does not require any calibration with a noiseless signal e.g. the noiseless signal 31. The only foreknowledge required for this method is that the noiseless signal exhibits a spectral amplitude correlation at frequencies $f_c \pm \alpha_0/2$ with $\hat{S}_x^{\alpha_0}(f_c)=1$. Whereas it may be advantageous to have foreknowledge of the symbol period $T_{symbol}$ of the modulated signal, in order to determine the frequencies $f_c \pm \alpha_0/2$, this information is not required when $\hat{S}_x^\alpha(f_c)$ is measured at a multitude of frequency pairs $f_c \pm \alpha/2$, with $\alpha$ ideally ranging from 0 to the largest possible value, and when $\langle P_N \rangle$ is determined from the maximal value of $\hat{S}_x^\alpha(f_c)$ observed in this multitude of measurements. Advantageously, the frequency range where $\hat{S}_x^{\alpha(f}_c)$ is expected to be maximal may be determined from a simple analysis of the signal's power spectrum. Preferably, the frequency interval between the measured spectral components, e.g. the spectral components 32 and 33 of FIG. 3, is substantially equal to the symbol repetition frequency of the modulated optical signal in the selected wavelength channel, or an integer multiple thereof. It is further preferable that differences between each of the first and second optical frequencies of the measured spectral components, and the carrier frequency $f_c$ of the modulated optical signal in the selected wavelength channel are substantially of equal magnitude.

Figure 4:
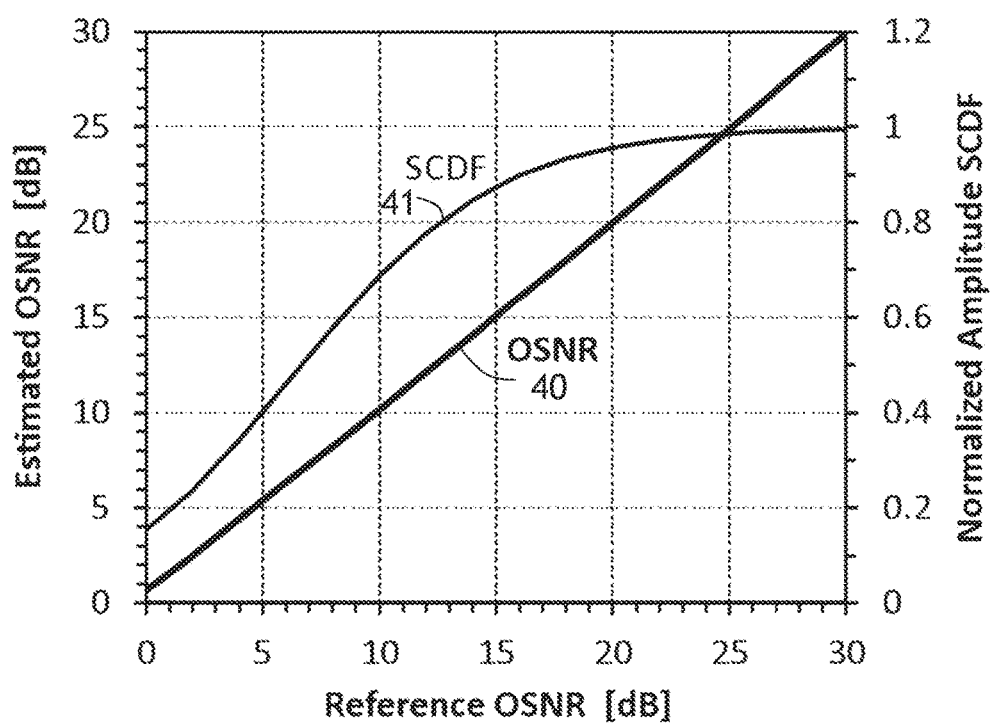
FIG. 4 illustrates a plot of a normalized amplitude spectral correlation density function (SCDF) evaluated at two spaced apart optical frequencies and of the OSNR estimated form the SCDF versus "true" in-band OSNR in a 100 Gb/s polarization-multiplexed RZ-QPSK signal.

The in-band OSNR measurement method of the present disclosure may be applied to transmitted signals that are encoded with chirp-free ASK, BPSK, ordinary QPSK, and other higher-order M-ary QAM formats without requiring detailed knowledge of the particular modulation format encoded in the analyzed noisy signal. Referring to FIG. 4, a numerical simulation of the in-band OSNR determined from the above equation is shown for a 100 Gb/s polarization-multiplexed QPSK signal. It can be seen from FIG. 4 that an estimated in-band OSNR 40 is substantially equal to the reference OSNR over a range from at least 0 dB to 30 dB. A normalized SCDF 41 is plotted for a reference.

Figure 5:
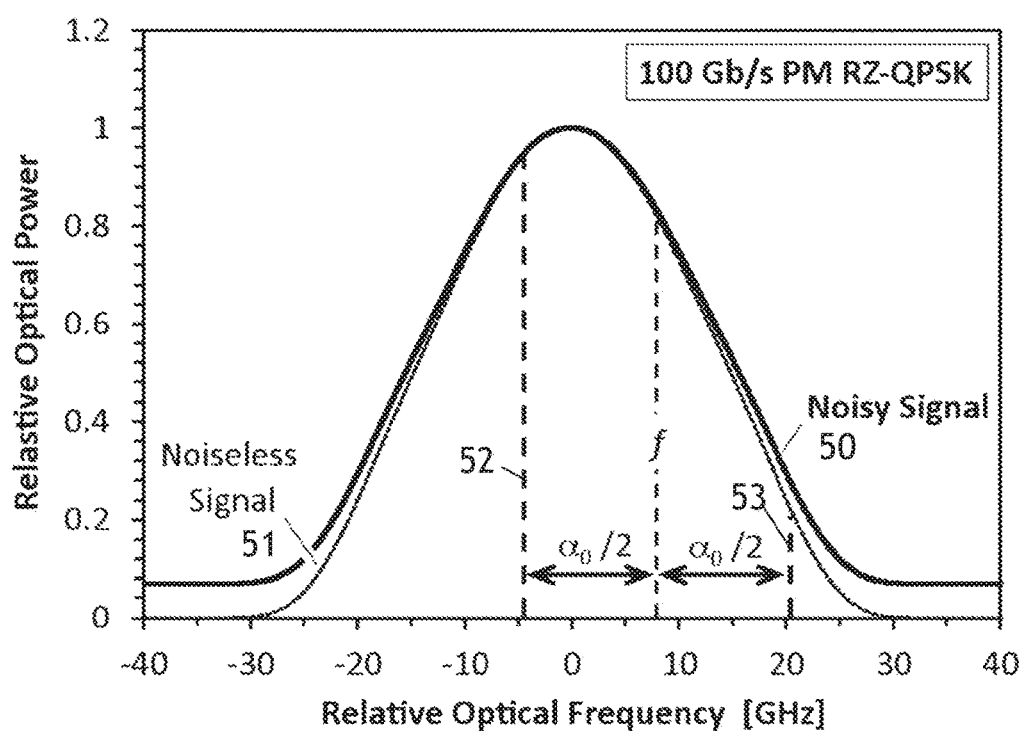
FIG. 5 illustrates a plot of an optical power spectrum of a noisy 100 Gb/s polarization-multiplexed RZ-QPSK signal, showing an example of the spectral components used for correlation measurements, in which the center frequency f is offset from the carrier frequency $f_c$ of the signal.

According to an aspect of the disclosure, the in-band OSNR of a transmitted noisy signal may be determined from a measurement of the spectral correlation of the optical amplitudes at any combination of frequencies $f \pm \alpha/2$ for which $\hat{S}_x^{\alpha_0}(f)=1$. It is known that digitally modulated signals encoded with ASK, BPSK, QPSK, or 16-QAM, for example, exhibit $\hat{S}_x^{\alpha_0}(f)=1$ as long as the two optical frequencies $f-\alpha_0/2$ and $f+\alpha_0/2$ are within the optical bandwidth of the modulated signal. This is illustrated in FIG. 5 for the example of a 100 Gb/s PM RZ-QPSK noisy signal 50, compared with a noiseless signal 51. In FIG. 5, optical frequencies 52 and 53, at which the time-varying signal measurements are performed, are offset from the carrier frequency $f_c$. However, it should be noted that the bandwidth of the transmitted optical signal may be limited by the spectral width of the DWDM channel. For example, when 50 Gb/s PM-BPSK, 100 Gb/s PM-QPSK, or 200 Gb/s PM-16-QAM signals (all having $T_{symbol}=40$ ps) are transmitted through a 50-GHz wide DWDM channel, the useful values of f are restricted to the range $f_c - \alpha_0/2 < f < f_c + \alpha_0/2$.

In the case of $f \neq f_c$ as shown in FIG. 5, one generally has $\langle P_S(f+\alpha_0/2) \rangle \neq \langle P_S(f-\alpha_0/2) \rangle$, so that the process of determining the OSNR becomes significantly more complicated. Denoting $\langle P_S(f+\alpha_0/2) \rangle = C \langle P_S(f-\alpha_0/2) \rangle \equiv C \langle P_S \rangle$, with $C > 0$ being a real number, the normalized SCDF is given by $$\hat{S}_x^{\alpha_0}(f) = \frac{\sqrt{C} \langle P_S \rangle}{\sqrt{\langle CP_S + P_N \rangle} \sqrt{\langle P_S + P_N \rangle}},$$

which may be solved analytically or numerically for $\langle P_N \rangle / (\langle P_S \rangle + \langle P_N \rangle)$.

However, at large OSNR values, one has $\langle P_S \rangle \gg \langle P_N \rangle$, so that the normalized SCDF may be approximated as $$\hat{S}_x^{\alpha_0}(f) \approx \frac{\langle P_S \rangle^2}{\langle P_S \rangle^2 + \frac{C+1}{2C} \langle P_S \rangle \langle P_N \rangle + \frac{\langle P_N \rangle^2}{2C}},$$

from which the average noise power $\langle P_N \rangle$ at the two frequencies $f \pm \alpha_0/2$ can be readily calculated as $$\frac{\langle P_N \rangle}{\langle P_S(f-\alpha_0/2) \rangle} = -\frac{C+1}{2} + \sqrt{\left(\frac{C+1}{2}\right)^2 + 2C \frac{1-\hat{S}_x^{\alpha_0}(f)}{\hat{S}_x^{\alpha_0}(f)}}$$

$$\approx \frac{2C}{C+1} \cdot \frac{1-\hat{S}_x^{\alpha_0}(f)}{\hat{S}_x^{\alpha_0}(f)},$$

or more conveniently as $$\frac{\langle P_N \rangle}{\langle P_S(f-\alpha_0/2) + P_N \rangle} \approx \frac{2C[1-\hat{S}_x^{\alpha_0}(f)]}{2C+(1-C)\hat{S}_x^{\alpha_0}(f)},$$

so that one obtains the in-band OSNR as $$OSNR \approx \frac{\sum_i \langle P_S(f_i) + P_N \rangle B_{meas}}{\langle P_S(f_c - \alpha_0/2) + P_N \rangle B_{noise}} \cdot \frac{1 + \frac{1-C}{2C} \hat{S}_x^{\alpha_0}(f)}{1 - \hat{S}_x^{\alpha_0}(f)} - \sum_i \frac{B_{meas}}{B_{noise}}$$

$$= \frac{\sum_i \langle P_S(f_c - \alpha_0/2) + P_N \rangle \frac{2C[1-\hat{S}_x^{\alpha_0}(f)]}{2C+(1-C)\hat{S}_x^{\alpha_0}(f)} B_{meas}}{\langle P_S(f_c - \alpha_0/2) + P_N \rangle \frac{2C[1-\hat{S}_x^{\alpha_0}(f)]}{2C+(1-C)\hat{S}_x^{\alpha_0}(f)} B_{noise}}$$

Therefore, in-band OSNR of a transmitted noisy signal can be determined from a measurement of the spectral correlation of the optical amplitudes at arbitrary frequencies $f \pm \alpha_0/2$ and an additional measurement of the optical power spectrum of the noisy signal. Again, this procedure does not require foreknowledge of the particular modulation format, bit-rate, or time-varying waveform of the transmitted signal. If the symbol period $1/\alpha_0$ of the signal is unknown, one may simply choose a suitable fixed value for $f-\alpha_0/2$, and then measure $\hat{S}_x^\alpha(f)$ at a multitude of frequency pairs $\{f-\alpha_0/2, f+\alpha/2\}$, with $\alpha$ ranging from 0 to the largest expected value. $\langle P_N \rangle$ may then be determined from a maximal value of $\hat{S}_x^\alpha(f_c)$ observed in these measurements.

However, accurate determination of the in-band OSNR may require foreknowledge of the ratio C of the two noiseless signal powers at $f \pm \alpha_0/2$, which may be determined from a measurement of the optical power spectrum of the noiseless signal (e.g. directly after the transmitter). If such measurement is not available, one may use the first-order approximation $$C \approx C_1 = \frac{\langle P_S(f - \alpha_0/2) + P_N \rangle}{\langle P_S(f + \alpha_0/2) + P_N \rangle},$$

to estimate the in-band OSNR in the signal, $$OSNR \approx \frac{\sum_i \langle P_S(f_i) + P_N \rangle B_{meas}}{\langle P_S(f_c - \alpha_0/2) + P_N \rangle B_{noise}} \cdot \frac{1 + \frac{1-C_1}{2C_1}\hat{S}_x^{\alpha_0}(f)}{1 - \hat{S}_x^{\alpha_0}(f)} - \sum_i \frac{B_{meas}}{B_{noise}}.$$

Figure 6:
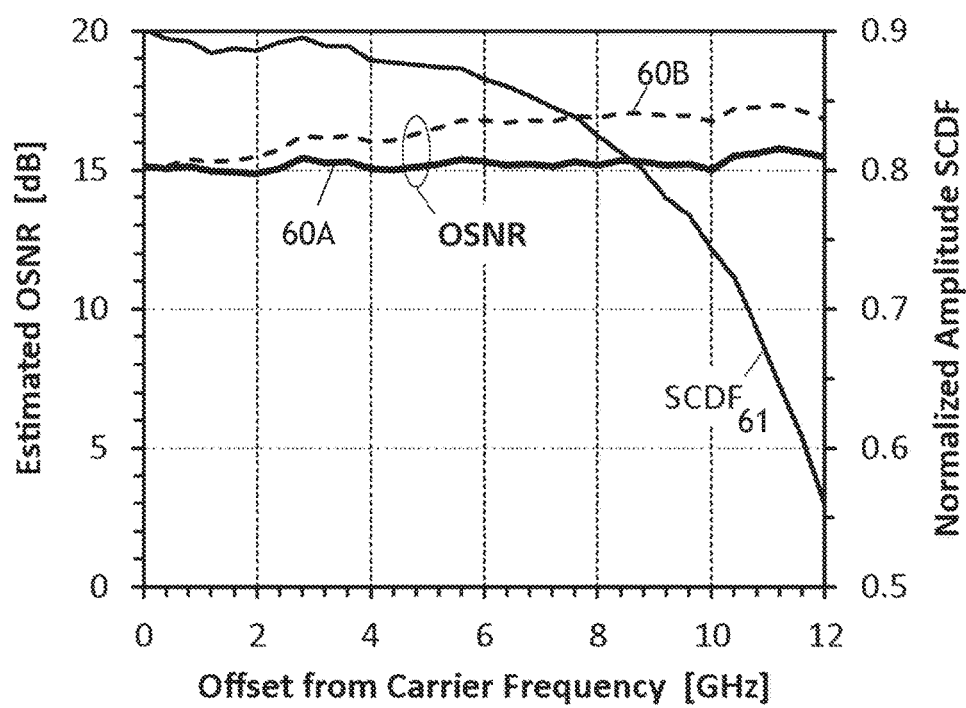
FIG. 6 illustrates a plot of a normalized amplitude SCDF and estimated OSNR versus frequency offset $f-f_c$ for a 100 Gb/s polarization-multiplexed RZ-QPSK signal.

Referring to FIG. 6, an example is shown of OSNR curves 60A and 60B estimated from a numerically simulated noisy 100 Gb/s PM-QPSK signal having an OSNR of 15 dB. The graph also displays a normalized amplitude SCDF 61 as a function of the frequency offset $f-f_c$. OSNR 60A has been calculated from the above equation using the first-order approximation $C \approx C_1$ (bold the SCDF 61 and the OSNR 60A are shown by solid curves). It can be seen that this approximation slightly overestimates the OSNR at offset frequencies beyond 8 GHz, where the signal power $\langle P_S(f+\alpha_0/2) \rangle$ is small and comparable to the noise power $\langle P_N \rangle$, as can be seen in FIG. 5. For comparison, the dashed curve 60B in FIG. 6 displays the in-band OSNR calculated from the exact formula for C=1. It is evident from this curve that this formula may lead to a substantial overestimation of the OSNR, e.g. by up to and more than 2 dB.

If the first-order approximation of C is not deemed to be accurate enough to determine the in-band OSNR, a second-order approximation may be employed, which may be obtained by subtracting the first-order average noise power $$\langle P_{N1} \rangle \approx \langle P_S(f - \alpha_0/2) + P_N \rangle \frac{2C_1[1-\hat{S}_x^{\alpha_0}(f)]}{2C_1+(1-C_1)\hat{S}_x^{\alpha_0}(f)}$$

from the two noisy signal powers measured at frequencies $f \pm \alpha_0/2$ and by recalculating C as $$C \approx C_2 = \frac{\langle P_S(f - \alpha_0/2) + P_N \rangle - \langle P_{N1} \rangle}{\langle P_S(f + \alpha_0/2) + P_N \rangle - \langle P_{N1} \rangle},$$

which may then be used for an improved second-order approximation of the in-band OSNR, $$OSNR \approx \frac{\sum_i \langle P_S(f_i) + P_N \rangle B_{meas}}{\langle P_S(f_c - \alpha_0/2) + P_N \rangle B_{noise}} \cdot \frac{1 + \frac{1-C_2}{2C_2}\hat{S}_x^{\alpha_0}(f)}{1 - \hat{S}_x^{\alpha_0}(f)} - \sum_i \frac{B_{meas}}{B_{noise}}.$$

The above described procedure may be iterated multiple times until the desired accuracy of the in-band OSNR is obtained.

Amplitudes of the spectral components of a transmitted signal may depend quite sensitively on signal distortions caused by chromatic dispersion (CD) or polarization-mode dispersion (PMD), which the modulated signal may have experienced in the transmission link prior to being analyzed at the OSNR monitoring point. Group velocity dispersion (GVD) from CD, for example, may introduce a differential phase shift between the spectral amplitudes of the Jones vectors $X_T(t,f+\alpha/2)$ and $X_T(t,f-\alpha/2)$, whereas PMD-induced differential group delays (DGDs) may introduce a differential polarization transformation between the two Jones vectors. Consequently, the correlation between the two spectral components may become severely distorted, so that $\hat{S}_x^{\alpha_0}(f) < 1$ even for noiseless signals. Therefore, uncompensated GVD and/or DGD in the noisy signal may lead to a substantial underestimation of the in-band OSNR when using the spectral correlation method disclosed above.

Fortunately, the differential phase shifts caused CD and the differential polarization transformation caused by PMD may be compensated for by artificially introducing differential phase shifts and/or differential polarization transformations in the measured Jones vectors $X_T(t,f+\alpha_0/2)$ and $X_T(t,f-\alpha_0/2)$, and by varying these phase shifts and/or polarization transformations until $\hat{S}_x^{\alpha_0}(f)$ is maximal. To that end, the step of determining the correlation may include (i) removing differential phase and time delays introduced by chromatic dispersion in the transmission link between the time-varying parameters at the optical frequencies, at which the measurement is performed; and (ii) removing a differential group delay introduced by polarization mode dispersion in the transmission link between the time-varying parameters at the first and second optical frequencies. Even if the GVD- and DGD-induced distortions in the signal amplitudes are not perfectly compensated, such procedure may substantially reduce errors of determining the in-band OSNR from the measured spectral correlation.

In another aspect of the present disclosure, the end-to-end GVD and DGD in the transmission link may be determined from an adaptive compensation of the GVD and DGD in the measured signal amplitudes using the above described algorithm for maximizing $\hat{S}_x^{\alpha_0}(f)$.

Figure 7:
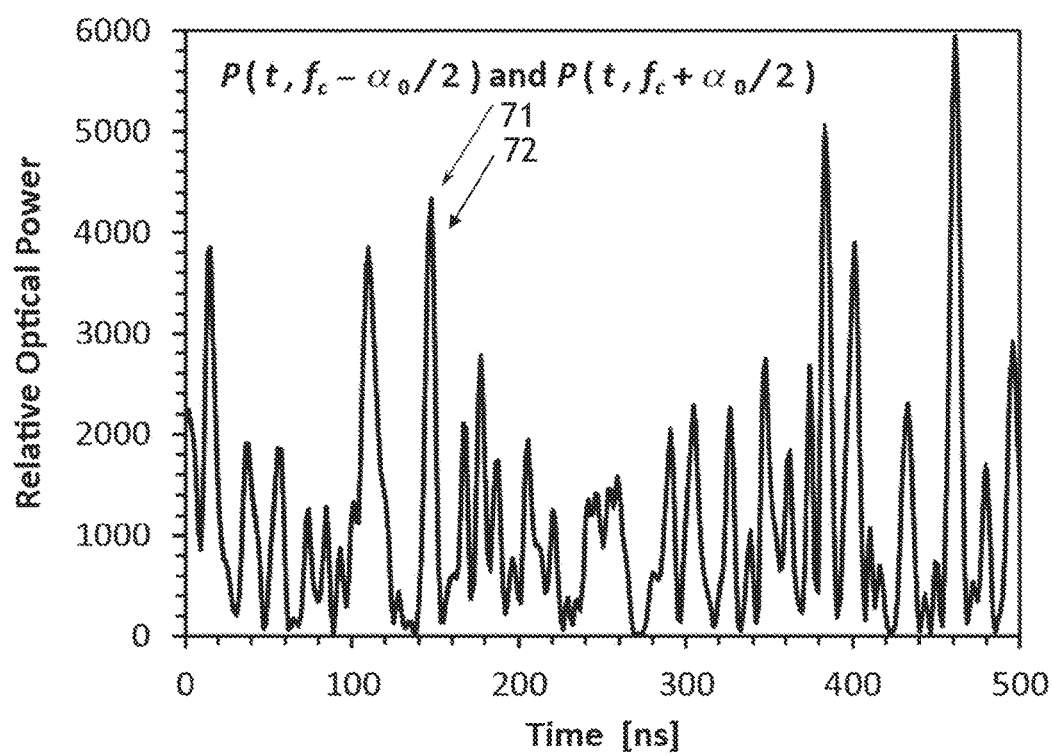
FIG. 7 illustrates a plot of optical power variations in two spectral components of a substantially noiseless 100 Gb/s PM-QPSK signal (>40 dB OSNR), measured at two spaced apart optical frequencies, with an optical bandwidth of 200 MHz.

The in-band OSNR may also be determined from the spectral correlations of the optical signal intensities (or signal powers) at two different frequencies, i.e. from the correlations between the spectral power components $\tilde{P}(t,v) = |\tilde{X}_T(t,v)|^2$. It follows from the above considerations that the spectral components of the signal power exhibit strong correlations whenever the spectral components of the signal amplitude are strongly correlated. Consequently, modulated optical signals encoded with ASK, BPSK, ordinary QPSK and 16-QAM formats exhibit strong correlations of the time-varying optical power components at frequencies $f\pm\alpha_0/2$. An example of the strong correlations between the time-varying signal powers 71, 72 at $f_c\pm\alpha_0/2$ is shown in FIG. 7 for a noiseless 100 Gb/s PM-QPSK signal. It can be seen from FIG. 7 that the power variations 71, 72 at the two frequencies overlap completely, i.e. they are substantially identical.

It should be noted that signals encoded with ASK and BPSK modulation exhibit additional correlations of the spectral power components beyond those found for the spectral amplitude components. It can be shown, for example, that the spectral power components of ASK and BPSK signals are correlated at any two pairs of frequencies $f_c\pm\alpha/2$ within the bandwidth of the signal, i.e. for arbitrary offset frequency $\alpha$.

Figure 8:
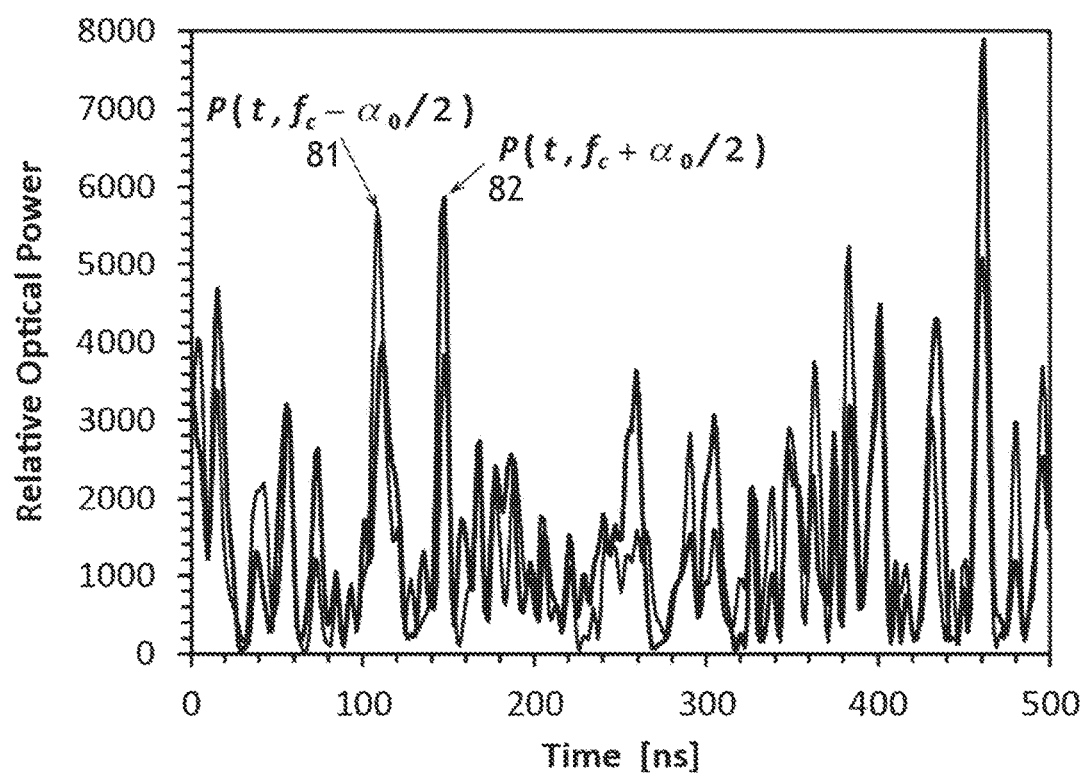
FIG. 8 illustrates a plot of optical power variations in two spectral components of a noisy 100 Gb/s PM-QPSK signal having an OSNR of only 12 dB OSNR, measured at two spaced apart optical frequencies, with an optical bandwidth of 200 MHz.

Just like for the optical amplitudes, the spectral components of the optical power levels of random ASE noise do not exhibit any significant correlations. When optical noise is added to a modulated signal, therefore, the correlation between the spectral components of the noisy signal power decreases with decreasing OSNR. An example of the reduced spectral correlations between the optical powers at $f_c\pm\alpha_0/2$ is shown in FIG. 8 for a noisy 100 Gb/s PM-QPSK signal having an OSNR of only 12 dB. It can be seen from this graph that variations 81, 82 of the two optical powers with time are substantially different.

Figure 9:
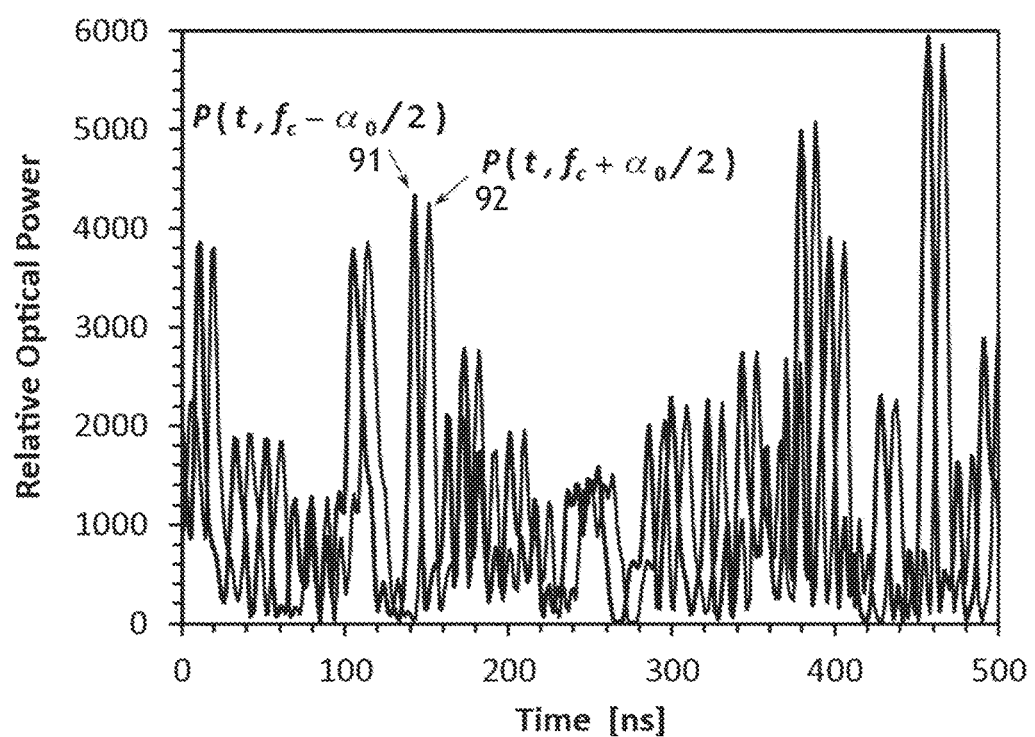
FIG. 9 illustrates a plot of optical power variations of two spectral components of a noiseless 100 Gb/s PM-QPSK signal distorted by chromatic dispersion with 50,000 ps/nm GVD.

Furthermore, it can be shown that the spectral correlations of the optical signal power are much less sensitive to waveform distortions caused by PMD and CD than the correlations of the optical signal amplitudes. In general, GVD from CD and/or DGD from PMD may introduce a differential time delay $\Delta t$ between the time-varying optical power measurements $\tilde{P}(t,f-\alpha/2)$ and $\tilde{P}(t,f+\alpha/2)$, leading to signals of the form $\tilde{P}(t-\Delta t/2,f-\alpha/2)$ and $\tilde{P}(t+\Delta t/2,f+\alpha/2)$, as shown in FIG. 9 for the example of a 100 Gb/s PM-QPSK signal distorted by 50 ns/nm GVD. Two curves 91, 92 in FIG. 9 are shifted in time by about 10 ns, but are otherwise substantially identical. Accordingly, these differential time delays may substantially reduce the spectral correlations in a noise-free signal and, hence, may need to be compensated prior to calculating the correlation between the two signals. This may be accomplished, for example, by introducing a variable time-delay between the two signals and by adaptively varying this delay until the correlation between the two signals is maximal.

For the purpose of the present disclosure, it is advantageous to define a normalized power SCDF for the spectral power components $\tilde{P}(t,f-\alpha/2)=|\tilde{X}_T(t,f-\alpha/2)|^2$ and $\tilde{P}(t,f+\alpha/2)=|\tilde{X}_T(t,f+\alpha/2)|^2$ of the noisy signal, analogous to the normalized amplitude SCDF described above:

$$\hat{S}_p^\alpha(f) \equiv \frac{\langle \tilde{P}(t, f+\alpha/2)\cdot \tilde{P}(t, f-\alpha/2)\rangle}{\sqrt{\langle [\tilde{P}(t, f+\alpha/2)]^2\rangle}\sqrt{\langle [\tilde{P}(t, f+\alpha/2)]^2\rangle}}.$$

It can be shown that noiseless signals encoded with ASK-, BPSK-, ordinary QPSK- and 16-QAM modulation exhibit $\hat{S}_p^{\alpha_0}(f)=1$ at any two frequency pairs $f\pm\alpha_0/2$ which are within the optical bandwidth of the transmitted signal. For modulated signals with added ASE noise, the normalized power SCDF is always less than unity, i.e. $\hat{S}_p^{\alpha_0}(f)<1$, just like the normalized amplitude SCDF. The normalized power SCDF for noisy signals can be calculated analytically as described below.

In the case of $\alpha\gg 1/T$, which is of interest in the present disclosure, the numerator of $\hat{S}_p^\alpha(f)$ can be expanded into the following terms $$\langle \tilde{P}(t,f+\alpha/2)\cdot\tilde{P}(t,f-\alpha/2)\rangle = \langle P_S(t,f+\alpha/2)\cdot P_S(t,f-\alpha/2)\rangle+$$
$$\langle P_S(t,f+\alpha/2)\cdot P_N(t,f-\alpha/2)\rangle +$$
$$\langle P_N(t,f+\alpha/2)\cdot P_S(t,f-\alpha/2)\rangle +$$
$$\langle P_N(t,f+\alpha/2)\cdot P_N(t,f-\alpha/2)\rangle,$$

wherein $$\langle P_S(t,f+\alpha/2)\cdot P_N(t,f-\alpha/2)\rangle = \langle P_S(t,f+\alpha/2)\rangle \langle P_N(t,f-\alpha/2)\rangle,$$

and likewise $$\langle P_N(t,f+\alpha/2)\cdot P_S(t,f-\alpha/2)\rangle = \langle P_N(t,f+\alpha/2)\rangle\cdot\langle P_S(t,f-\alpha/2)\rangle,$$

because the time-varying signal amplitudes are not correlated with the random variations of the noise amplitudes. Furthermore, since the random noise power variations at substantially different optical frequencies are uncorrelated, one has $$\langle P_N(t,f+\alpha/2)\cdot P_N(t,f-\alpha/2)\rangle = \langle P_N(t,f+\alpha/2)\rangle\cdot\langle P_N(t,f-\alpha/2)\rangle = \langle P_N(t,f+\alpha/2)\rangle^2.$$

Similarly, the two terms in the denominator of $\hat{S}_p^\alpha(f)$ can be expressed as $$\langle [\tilde{P}(t,f+\alpha/2)]^2\rangle = \langle [P_S(t,f+\alpha/2)]^2\rangle + \langle [P_N(t,f+\alpha/2)]^2\rangle + 3\langle P_S(t,f+\alpha/2)\rangle\cdot\langle P_N(t,f+\alpha/2)\rangle$$

$$\langle [\tilde{P}(t,f-\alpha/2)]^2\rangle = \langle [P_S(t,f-\alpha/2)]^2\rangle + \langle [P_N(t,f-\alpha/2)]^2\rangle + 3\langle P_S(t,f-\alpha/2)\rangle\cdot\langle P_N(t,f-\alpha/2)\rangle,$$

wherein the third term on the right side of these equations includes the contribution $$\langle \{Re[X_T(t,f\pm\alpha/2)\cdot N_T^*(t,f\pm\alpha/2)]\}^2\rangle = \tfrac{1}{4}\langle P_S(t,f\pm\alpha/2)\rangle\cdot\langle P_N(t,f\pm\alpha/2)\rangle.$$

Therefore, in the special case of $f=f_c$ and $\alpha=\alpha_0$, the power SCDF can be written in the form $$\hat{S}_p^{\alpha_0}(f_c) = \frac{\langle P_S^2(f_c\pm\alpha_0/2)\rangle + 2\langle P_S(f_c\pm\alpha_0/2)\rangle\cdot\langle P_N\rangle + \langle P_N\rangle^2}{\langle P_S^2(f_c\pm\alpha_0/2)\rangle + 3\langle P_S(f_c\pm\alpha_0/2)\rangle\cdot\langle P_N\rangle + \langle P_N^2\rangle},$$

wherein $$\langle P_N\rangle = \langle P_N(t, f_c\pm\alpha_0/2)\rangle = \langle P_N(t, f_c-\alpha_0/2)\rangle,$$

$$\langle P_N^2\rangle = \langle [P_N(t, f_c\pm\alpha_0/2)]^2\rangle = \langle [P_N(t, f_c-\alpha_0/2)]^2\rangle$$

The above expression for the power SCDF contains two unknown and potentially large quantities $\langle P_S^2\rangle$ and $\langle P_N^2\rangle$, which cannot be directly measured or obtained from the measurements of the combined signal and noise powers at frequencies $f+\alpha/2$ and $f-\alpha/2$.

It is known that the averaged squared noise power $\langle P_N^2\rangle$ is related to the average noise power $\langle P_N\rangle$ as $\langle P_N^2\rangle = 1.5\langle P_N\rangle^2$, because of the statistical properties of random ASE noise.) With reference to J. W. Goodman, *Statistical Optics* (John Wiley and Sons, New York 1985), optical ASE noise can be described as a Gaussian random process, which remains a Gaussian random process even after arbitrary linear optical filtering (e.g. before or in the optical receiver). Thus, the relation $\langle P_N^2\rangle=1.5\langle P_N\rangle^2$ can be obtained from the known second and fourth moments of a Gaussian random process.

Furthermore, according to the present disclosure, the quantity $\langle P_S^2\rangle$ can be eliminated by multiplying the complementary power SCDF, $$1+\hat{S}_p^{\alpha_0}(f_c) = \frac{\langle P_N^2\rangle - \langle P_N\rangle^2 + \langle P_S(f_c \pm \alpha_0/2)\rangle \cdot \langle P_N\rangle}{\langle P_S^2(f_c \pm \alpha_0/2)\rangle + 3\langle P_S(f_c \pm \alpha_0/2)\rangle \cdot \langle P_N\rangle + \langle P_N^2\rangle},$$

with the dimensionless factor $D(f_c,\alpha_0)$, defined as $$D(f,\alpha) = \frac{\sqrt{\langle [\tilde{P}(t, f+\alpha/2)]^2\rangle}\sqrt{\langle [\tilde{P}(t, f-\alpha/2)]^2\rangle}}{\langle \tilde{P}(t, f+\alpha/2)\rangle \cdot \langle \tilde{P}(t, f-\alpha/2)\rangle},$$

which can be readily calculated from the measured signal and noise powers $\tilde{P}(t,f\pm\alpha/2)$.

At optical frequencies $f_c+\alpha_0/2$ and $f_c-\alpha_0/2$, one obtains $$D(f_c,\alpha_0) = \frac{\langle P_S^2(f_c \pm \alpha_0/2)\rangle + 3\langle P_S(f_c \pm \alpha_0/2)\rangle \cdot \langle P_N\rangle + \langle P_N^2\rangle}{\langle P_S(f_c \pm \alpha_0/2)\rangle^2 + 2\langle P_S(f_c \pm \alpha_0/2)\rangle \cdot \langle P_N\rangle + \langle P_N\rangle^2},$$

and after multiplication with the complementary power SCDF $$\hat{D}_p^{\alpha_0}(f_c) = [1-\hat{S}_p^{\alpha_0}(f_c)]D(f_c,\alpha_0) = \frac{0.5\langle P_N\rangle^2 + \langle P_S(f_c \pm \alpha_0/2)\rangle \cdot \langle P_N\rangle}{\langle P_S(f_c \pm \alpha_0/2) + P_N\rangle^2}.$$

This equation can be solved for $\langle P_N\rangle$ $$\frac{\langle P_N\rangle}{\langle P_S(f_c \pm \alpha_0/2) + P_N\rangle} = 1-\sqrt{1-2\hat{D}_p^{\alpha_0}(f_c)2},$$

and substituted into the equation for OSNR to produce $$OSNR = \frac{\sum_i \langle P_S(f_i)+P_N\rangle B_{meas}}{\langle P_S(f_c \pm \alpha_0/2)+P_N\rangle B_{noise}} \cdot \frac{1}{1-\sqrt{1-2\hat{D}_p^{\alpha_0}(f_c)}} - \sum_i \frac{B_{meas}}{B_{noise}}$$

$$= \frac{\sum_i \left\{\langle P_S(f_i)+P_N\rangle - \langle P_S(f_c \pm \alpha_0/2)+P_N\rangle\left[1-\sqrt{1-2\hat{D}_p^{\alpha_0}(f_c)}\right]\right\}B_{meas}}{\langle P_S(f_c \pm \alpha_0/2)+P_N\rangle\left[1-\sqrt{1-2\hat{D}_p^{\alpha_0}(f_c)}\right]B_{noise}},$$

wherein again the summation extends over the entire spectral width of the transmitted optical signal.

Therefore, the in-band OSNR in a noisy signal can be determined from a spectral correlation measurement of the signal powers at optical frequencies $f_c+\alpha_0/2$ and $f_c-\alpha_0/2$. Just like in the case of using correlation measurements of the signal's amplitude, these measurements do not require foreknowledge of the signal's modulation format, bitrate, or waveform.

Figure 10:
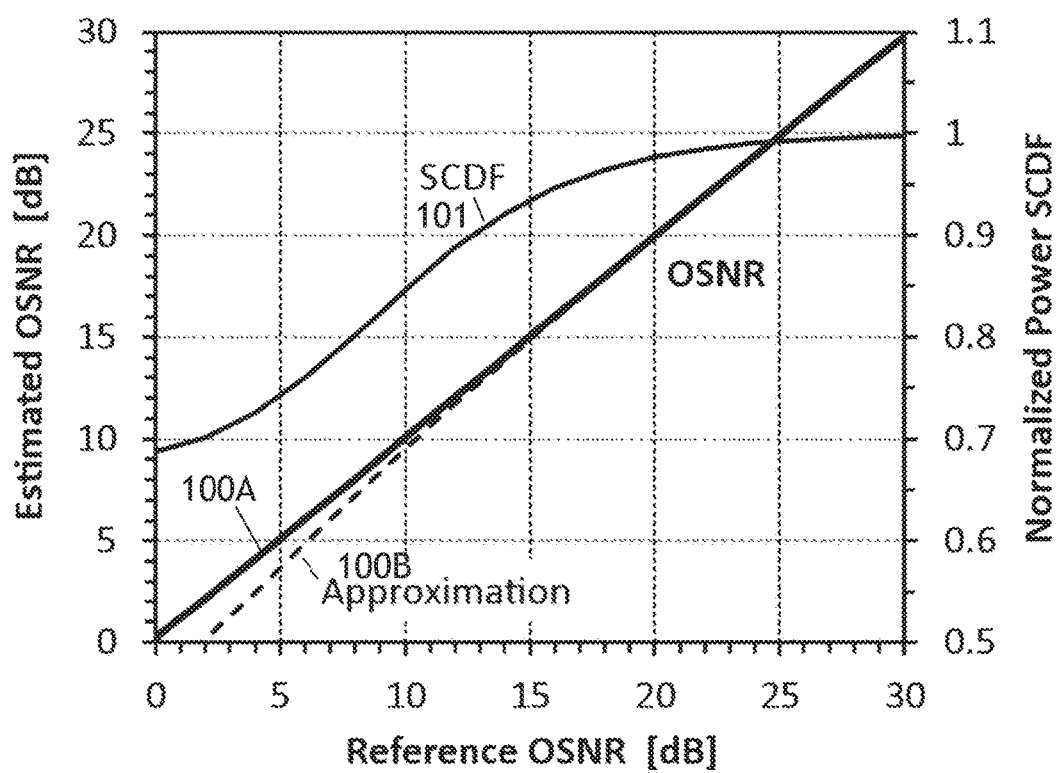
FIG. 10 illustrates a plot of the normalized power SCDF at two spaced apart optical frequencies centered around $f_c$, and the estimated OSNR calculated for a 100 Gb/s PM RZ-QPSK signal.

For large OSNR values (e.g. larger than 15 dB for a 100 Gb/s PM RZ-QPSK signal), one may approximate the in-band OSNR by the simpler expression $$OSNR \approx \frac{\sum_i \langle P_S(f_i)+P_N\rangle B_{meas}}{\langle P_S(f_c \pm \alpha_0/2)+P_N\rangle B_{noise}} \cdot \left[\frac{1}{\hat{D}_p^{\alpha_0}(f_c)}-1\right] - \sum_i \frac{B_{meas}}{B_{noise}}$$

$$\approx \frac{\sum_i \langle P_S(f_i)+P_N\rangle B_{meas}}{\langle P_S(f_c \pm \alpha_0/2)+P_N\rangle B_{noise}} \cdot \frac{1}{\hat{D}_p^{\alpha_0}(f_c)} - \sum_i \frac{B_{meas}}{B_{noise}}$$

$$= \frac{\sum_i \left\{\langle P_S(f_i)+P_N\rangle - \langle P_S(f_c \pm \alpha_0/2)+P_N\rangle\hat{D}_p^{\alpha_0}(f_c)\right\}B_{meas}}{\langle P_S(f_c \pm \alpha_0/2)+P_N\rangle\hat{D}_p^{\alpha_0}(f_c)B_{noise}},$$

because $\langle P_N\rangle \ll \langle P_S\rangle$, so that $\hat{S}_p^{\alpha_0}(f_c)\approx 1$ and hence $\hat{D}_p^{\alpha_0}(f_c)\ll 1$. FIG. 10 displays a numerical simulation of the reference in-band OSNR 100A determined from the above equation for a 100 Gb/s PM-QPSK signal. The reference in-band OSNR 100A is shown with a thick solid line. A normalized power SCDF 101 at $f_c\pm\alpha_0/2$ is also shown. It is seen that an estimated in-band OSNR 100B, shown with a dashed line, is substantially equal to the reference in-band OSNR 100A over a range from about 15 dB to at least 30 dB.

Importantly, in-band OSNR may be determined from a spectral correlation measurement of transmitted signal powers at any frequency pair $f\pm\alpha_0/2$ within the spectral bandwidth of the signal, similar to the spectral correlation measurement of the transmitted signal amplitudes described above. Letting again $\langle P_S(f+\alpha_0/2)\rangle = C\langle P_S(f-\alpha_0/2)\rangle \equiv C\langle P_S\rangle$, with $C>1$ being a real number, the normalized SCDF of the signal powers has the general form $$\hat{S}_p^{\alpha_0}(f) = \frac{C\langle P_S^2\rangle + (1+C)\langle P_S\rangle \cdot \langle P_N\rangle + \langle P_N\rangle^2}{\sqrt{\langle P_S^2\rangle + 3\langle P_S\rangle \cdot \langle P_N\rangle + \langle P_N^2\rangle}\sqrt{C^2\langle P_S^2\rangle + 3C\langle P_S\rangle \cdot \langle P_N\rangle + \langle P_N^2\rangle}},$$

wherein $\langle P_N^2\rangle = 1.5\langle P_N\rangle^2$. It is possible to eliminate the unknown quantity $\langle P_S^2\rangle$ from the above equation, using the dimensionless factor $$D(f,\alpha_0) = $$

$$\frac{\sqrt{\langle P_S^2\rangle + 3\langle P_S\rangle \cdot \langle P_N\rangle + \langle P_N^2\rangle}\sqrt{C^2\langle P_S^2\rangle + 3C\langle P_S\rangle \cdot \langle P_N\rangle + \langle P_N^2\rangle}}{\langle CP_S+P_N\rangle\langle P_S+P_N\rangle},$$

but the results are fairly complex.

For signals with relatively large OSNR (e.g. above 15 dB for a 100 Gb/s PM RZ-QPSK signal), one may neglect the terms proportional to $\langle P_N\rangle^2$ and $\langle P_N^2\rangle$, so that the complementary SCDF may be simplified to $$1-\hat{S}_p^{\alpha_0}(f) \approx \frac{0.5(1+C)\langle P_S\rangle \cdot \langle P_N\rangle}{\sqrt{\langle P_S^2\rangle + 3\langle P_S\rangle \cdot \langle P_N\rangle}\sqrt{C^2\langle P_S^2\rangle + 3C\langle P_S\rangle \cdot \langle P_N\rangle}},$$

so that $$\hat{D}_p^{\alpha_0}(f) \equiv [1 - \hat{S}_p^{\alpha_0}(f)]D(f, \alpha_0) \approx \frac{0.5(1+C)\langle P_S \rangle \cdot \langle P_N \rangle}{C\langle P_S \rangle^2 + (C+1)\langle P_S \rangle \cdot \langle P_N \rangle}.$$

This expression can be readily solved for $\langle P_N \rangle$, yielding $$\langle P_N \rangle \approx \frac{2C\hat{D}_p^{\alpha_0}(f)}{1 + C - 2\hat{D}_p^{\alpha_0}(f)} \langle P_S + P_N \rangle,$$

and subsequently substituted into the equation for the OSNR:

$$OSNR \approx \frac{\sum_i \langle P_S(f_i) + P_N \rangle B_{meas}}{\langle P_S(f - \alpha_0/2) + P_N \rangle B_{noise}} \cdot \left\{ \frac{1+C}{2C\hat{D}_p^{\alpha_0}(f)} - \frac{1}{C} \right\} - \sum_i \frac{B_{meas}}{B_{noise}}$$

$$\approx \frac{\sum_i \langle P_S(f_i) + P_N \rangle B_{meas}}{\langle P_S(f - \alpha_0/2) + P_N \rangle B_{noise}} \cdot \frac{1+C}{2C\hat{D}_p^{\alpha_0}(f)} - \sum_i \frac{B_{meas}}{B_{noise}}$$

$$= \frac{\sum_i \left\{ \langle P_S(f_i) + P_N \rangle - \frac{2C\hat{D}_p^{\alpha_0}(f)}{1 + C - 2\hat{D}_p^{\alpha_0}(f)} \langle P_S(f - \alpha_0/2) + P_N \rangle \right\} B_{meas}}{\frac{2C\hat{D}_p^{\alpha_0}(f)}{1+C} \langle P_S(f \pm \alpha_0/2) + P_N \rangle B_{noise}}.$$

Figure 11:
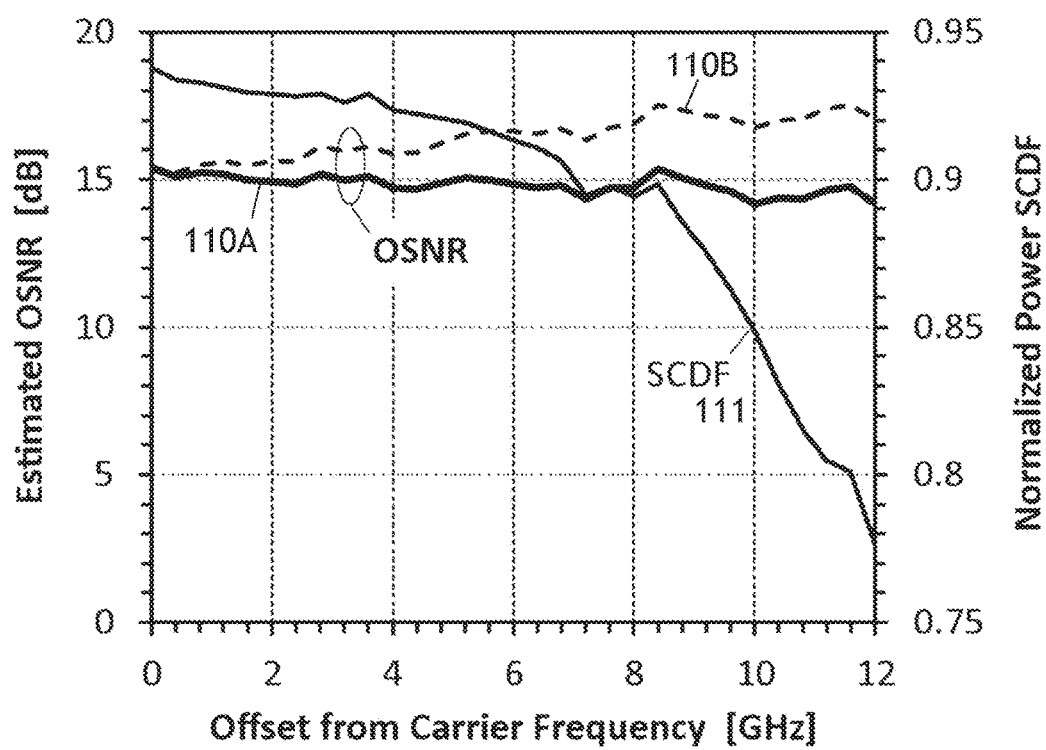
FIG. 11 illustrates a plot of the normalized power SCDF and the estimated OSNR versus frequency offset $f-f_c$ calculated for a 100 Gb/s PM RZ-QPSK signal.

FIG. 11 shows an example of OSNR curves 110A, 110B estimated from a numerically simulated noisy 100 Gb/s PM-QPSK signal having an OSNR of 15 dB. The graph also displays a normalized power SCDF 111 as a function of the frequency offset $f-f_c$. The OSNR 110A has been calculated from the above equation, where C is calculated directly from the noisy signal spectrum, i.e. $C \approx \langle P_S(f-\alpha_0/2)+P_N \rangle / \langle P_S(f+\alpha_0/2)+P_N \rangle$ (the OSNR 110A is shown with a bold solid line). It can be seen from this graph that the above approximation slightly underestimates the OSNR at offset frequencies beyond 8 GHz, where the magnitude of the signal power $\langle P_S(f+\alpha_0/2) \rangle$ becomes comparable to that of the noise power $\langle P_N \rangle$, as seen in FIG. 5, so that terms proportional to $\langle P_N \rangle^2$ may not be neglected and the above approximation for the in-band OSNR is no longer valid. For comparison, the dashed curve 110B in FIG. 11 displays the in-band OSNR calculated from the formula derived for C=1.

Figure 12:
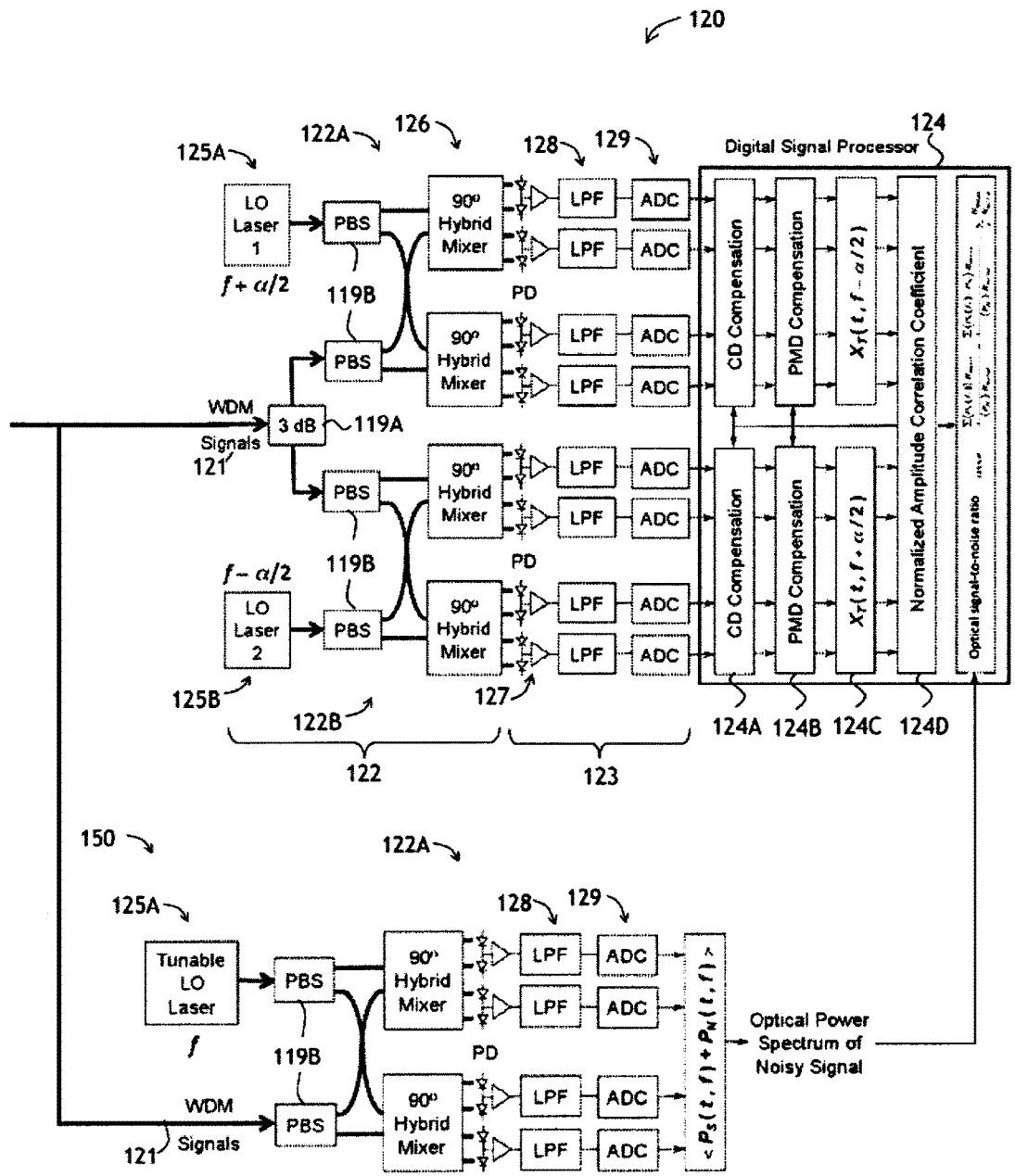
FIG. 12 is a schematic illustration of an apparatus for measuring amplitude correlations in the spectrum of a modulated signal, using two parallel coherent receiver channels with phase and polarization diversity and subsequent digital signal processing.

Amplitudes and phases of the spectral signal components, preferably at optical frequencies $f+\alpha_0/2$ and $f-\alpha_0/2$ as described above, may be detected simultaneously by two parallel coherent optical receivers, each having phase and polarization diversity. With reference to FIG. 12, an exemplary apparatus 120 for determining OSNR of a modulated optical signal 121 may generally include a frequency selective splitter 122, a measuring unit 123, and a digital signal processor (DSP) 124. The modulated optical signal 121 contains a plurality of wavelength channels, e.g. wavelength division multiplexed (WDM) channels, or dense WDM (DWDM) channels, and is normally obtained at a test point along the communication link. An optional spectrum analyzer, not shown, may be used for measuring an optical power spectrum of the modulated optical signal 121. To be useful in the measurement, the optical power spectrum should have at least one of the plurality of wavelength channels.

In the embodiment shown, the frequency selective splitter 122 is a dual-channel coherent receiver having a tunable local oscillator light source, e.g. a pair of cw tunable lasers ("local oscillators", or LO lasers) 125A and 125B tuned to first and second frequencies, for example $f+\alpha_0/2$ and $f-\alpha_0/2$ respectively. The frequency selective splitter 122 further includes a 3 dB splitter 119A and four polarization beam-splitters (PBS) 119B optically coupled as shown. The modulated optical signal 121 is mixed with the corresponding local oscillator laser signals in hybrid mixers 126. The measuring unit 123 includes differential photodetectors 127, low-pass filters (LPFs) 128, and analog-to-digital converters (ADC) 129. Other suitable configurations may be used.

In operation, the frequency selective splitter 122 selects portions of the modulated optical signal 121 at first and second predetermined optical frequencies, in a selected one of the plurality of wavelength channels. The first and second predetermined optical frequencies are separated by a non-zero frequency interval, e.g. $\alpha_0$ as explained above. To that end, the modulated optical signal 121 is divided into two identical copies by means of the 3 dB power splitter 119A, which are then coupled into the two substantially identical coherent receiver "channels", i.e. receivers 122A and 122B. Each copy of the modulated signal 121 is mixed with a highly coherent light from one of the tunable lasers 125A and 125B outputting a highly coherent continuous-wave optical signal at a predetermined optical frequency. The frequencies of the two local oscillator lasers are set to be substantially equal to the two frequencies at which the spectral correlation is to be measured, i.e. to $f_1=f+\alpha_0/2$ and $f_2=f-\alpha_0/2$, respectively. The tunable lasers 125A and 125B preferably have a narrow linewidth, e.g. no greater than 100 kHz.

Prior to mixing with the output light of the tunable lasers 125A and 125B, each of the two copies of the modulated signal is decomposed into two signals having mutually orthogonal polarization states by means of the PBS 119B. Furthermore, each of the two orthogonally polarized signals is further split into two identical copies and then independently mixed with the output light from the tunable LO lasers 125A and 125B, by means of the 90° hybrid mixers 126. The first copy is mixed with the LO light having an arbitrary optical phase and the second copy with the LO light having an optical phase shifted by 90° relative to the LO light used for the first copy. Such a receiver is referred to herein as a coherent receiver having polarization and phase diversity.

The measuring unit 123 measures time-varying optical amplitudes and phases of the first and second portions of the modulated optical signal 121. To that end, the four different mixing products in each of the two coherent receiver channels 122A and 122B are then detected by balanced photodetectors 127, which convert the coherently mixed optical amplitudes of the received signal and LO laser into a proportional electrical current, but substantially reject all non-coherently detected signal powers. The four time-varying detector currents $i_k(t)$, k=1, . . . , 4, are subsequently amplified and filtered by the four identical electrical LPFs 128, before they are converted into digital signals by a set of four high-resolution ADCs 129, preferably having an effective number of bits (ENOB) of at least 12 and a sampling rate substantially higher than two times the bandwidth of LPFs.

Once the time-varying amplitudes and phases have been measured, the signal processor 124 determines a correlation between the time-varying amplitudes and phases of the first and second portions of the modulated optical signal, and calculates the OSNR from the correlation of the time-varying parameters and the power spectrum of the modulated optical signal 121. This may be done as follows. The four receiver currents $i_1(t, f \pm \alpha/2), \ldots, i_4(t, f \pm \alpha/2)$, generated in each of the two coherent receiver channels 122A and 122B, describe the amplitude, phase, and polarization state of the received optical signal at frequencies $f \pm \alpha/2$. The four currents may be used to form a two-dimensional complex Jones vector that is proportional to the Jones vector of the optical signal, i.e.

$$\tilde{X}_T(t, f \pm \alpha/2) = \beta \begin{bmatrix} i_1(t, f \pm \alpha/2) + ji_2(t, f \pm \alpha/2) \\ i_3(t, f \pm \alpha/2) + ji_4(t, f \pm \alpha/2) \end{bmatrix},$$

where $\beta$ is an undetermined proportionality factor and $j = \sqrt{-1}$. Hence, the Jones vectors formed by the four receiver currents in each of the two coherent receivers may be used to calculate the normalized amplitude SCDF. Preferably, this is accomplished in a fast digital signal processor (DSP), which processes the data at the sampling rate of the ADC 129.

Prior to calculating the amplitude SCDF, any undesired differential phase shifts between the two Jones vectors $\tilde{X}_T(t, f-\alpha/2)$ and $\tilde{X}_T(t, f+\alpha/2)$ 124C may be removed (or compensated) by digital signal processing, as described above, including differential phase shifts introduced by CD in the communication systems ("CD compensation") as well as static phase shifts introduced in the receiver. This is done by a CD compensation module 124A. Likewise, any PMD-induced differential polarization transformations between the two Jones vectors may be removed ("PMD compensation"). This is done by a PMD compensation module 124B. This digital CD and PMD compensation may be accomplished iteratively by means of a feedback loop, in which the differential phase shifts and the differential polarization transformations are varied in sufficiently small steps until the amplitude SCDF reaches a maximum. Then, the normalized amplitude correlation coefficient is computed by a computing module 124D.

Figure 13:
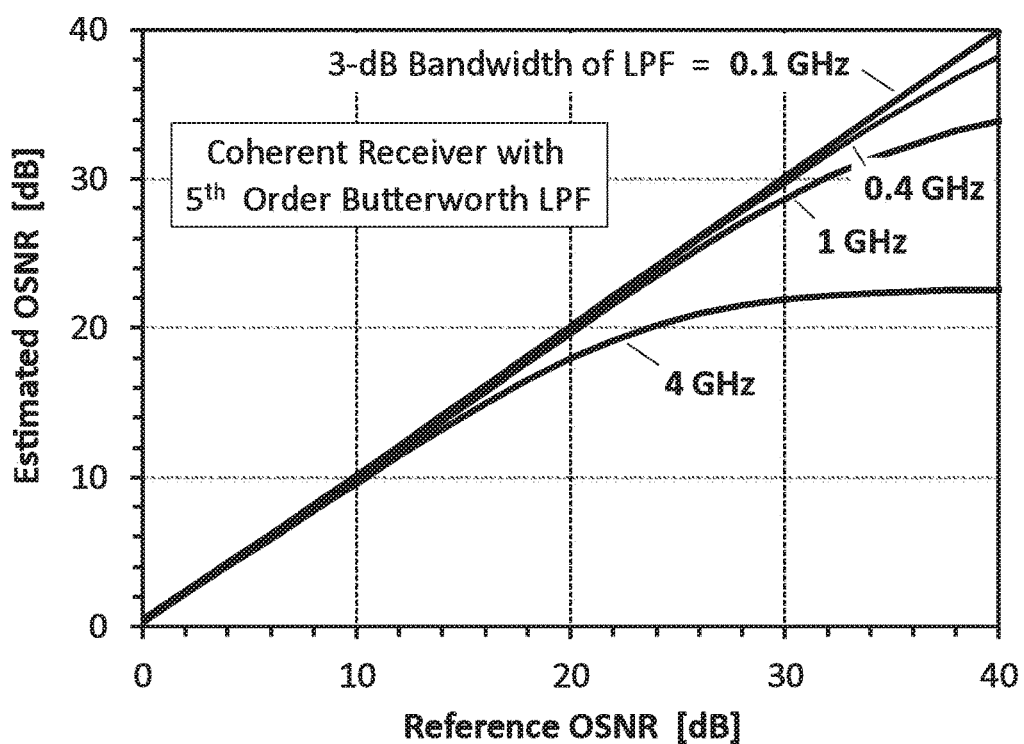
FIG. 13 illustrates a plot of OSNR estimated from amplitude SCDF in a coherently received 100 Gb/s PM RZ-QPSK signal versus reference OSNR, calculated for a receiver with $5^{th}$-order Butterworth electric low-pass filter having four different bandwidths.

For in-band OSNR measurements in QPSK and higher-order M-ary QAM signals, the electrical bandwidth of the coherent receiver 122, which is substantially equal to twice the bandwidth of the LPF 128, shall preferably be as small as possible, so that the correlation between the two detected Jones vectors is maximal. On the other hand, the receiver bandwidth has to be wide enough so that a sufficiently large electrical signal is available for determining the SCDF. Preferably, the 3-dB electrical bandwidth of the LPF 128 should be around 100 MHz for in-band OSNR measurements in 40 Gb/s and 100 Gb/s PM-QPSK signals. FIG. 13 illustrates effects of the receiver bandwidth on the accuracy of OSNR measurements on a coherently detected 100 Gb/s PM RZ-QPSK signal for the 3 dB bandwidth of the LPF 128 of 0.1 GHz, 0.4 GHz, 1 GHz, and 4 GHz. Severe degradations of the measurement accuracy are seen at high OSNR values when the receiver bandwidth substantially exceeds 400 MHz. It should be noted that the bandwidth requirement for the LPF 128 may scale linearly with the bit-rate of the signal 121.

Figure 14:
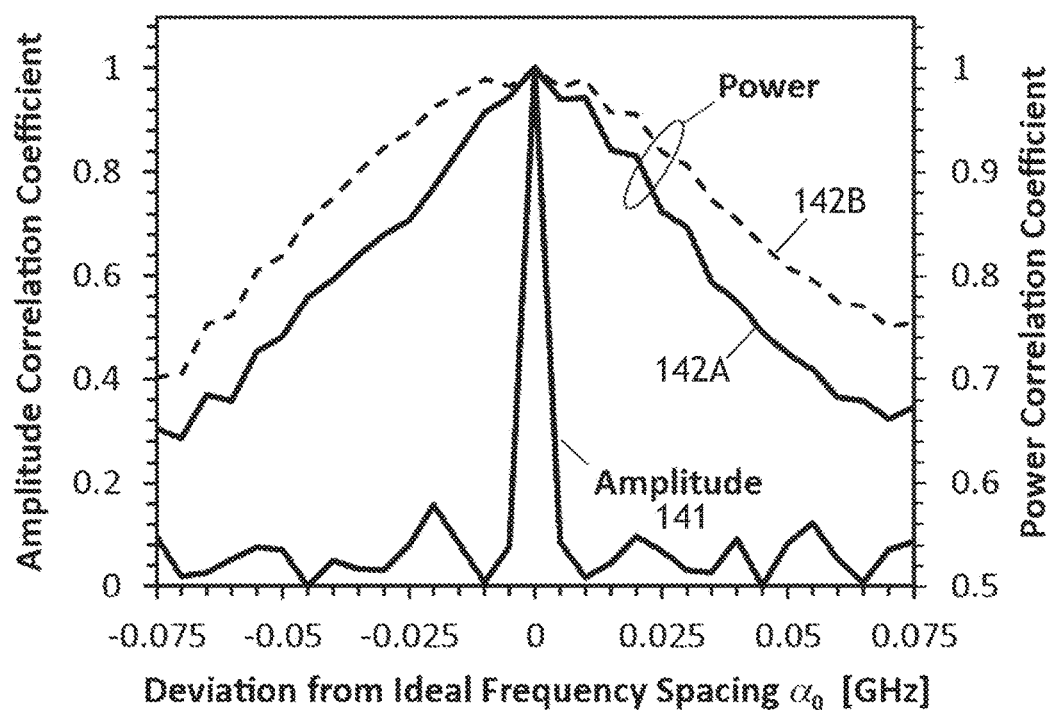
FIG. 14 illustrates a plot of a normalized amplitude and power SCDFs in a 100 Gb/s PM RZ-QPSK signal versus frequency separation of local oscillator (LO) lasers, displayed versus frequency deviation. The solid curves assume an electrical receiver with $5^{th}$-order Butterworth low-pass filter and the dashed curve a receiver with $5^{th}$-order Bessel low-pass filter, both having a 3-dB bandwidth of 40 MHz.

Furthermore, the optical frequencies of the two tunable (LO) lasers 125A and 125B needs to be precisely adjusted in order to measure maximal correlation between the spectral components of the analyzed optical signal 121. This can be accomplished by first setting one of the two LO lasers (e.g. 125A) to a fixed frequency within the spectral bandwidth of the signal, and by then varying the optical frequency of the other LO laser (e.g. 125B) continuously or in sufficiently small steps until the SCDF reaches a maximum. It is to be noted that a maximal amplitude correlation can only be observed over a very narrow optical frequency range, e.g. of less than 1 MHz. FIG. 14 displays a numerical simulation of an amplitude SCDF 141 as a function of the frequency separation of the two LO lasers 125A, 125B (FIG. 12) for the case of a 100 Gb/s PM-QPSK signal. In contrast, maximal power correlation curves 142A, 142B (FIG. 14) can be observed over a frequency range of several MHz, which scales linearly with the electrical bandwidth of the receiver. Consequently, spectral correlation measurements require LO lasers with high frequency stability and low frequency noise. Typically, LO lasers 125A, 125B having a linewidth of less than 10 kHz are preferable for amplitude correlation measurements, whereas LO lasers with a linewidth of less than 100 kHz may be sufficient for power correlation measurements. Solid curves 141, 142A correspond to an electrical receiver with fifth-order Butterworth low-pass filter, and the dashed curve 142B corresponds to a receiver with fifth-order Bessel low-pass filter, both having a 3-dB bandwidth of 40 MHz.

Figure 15:
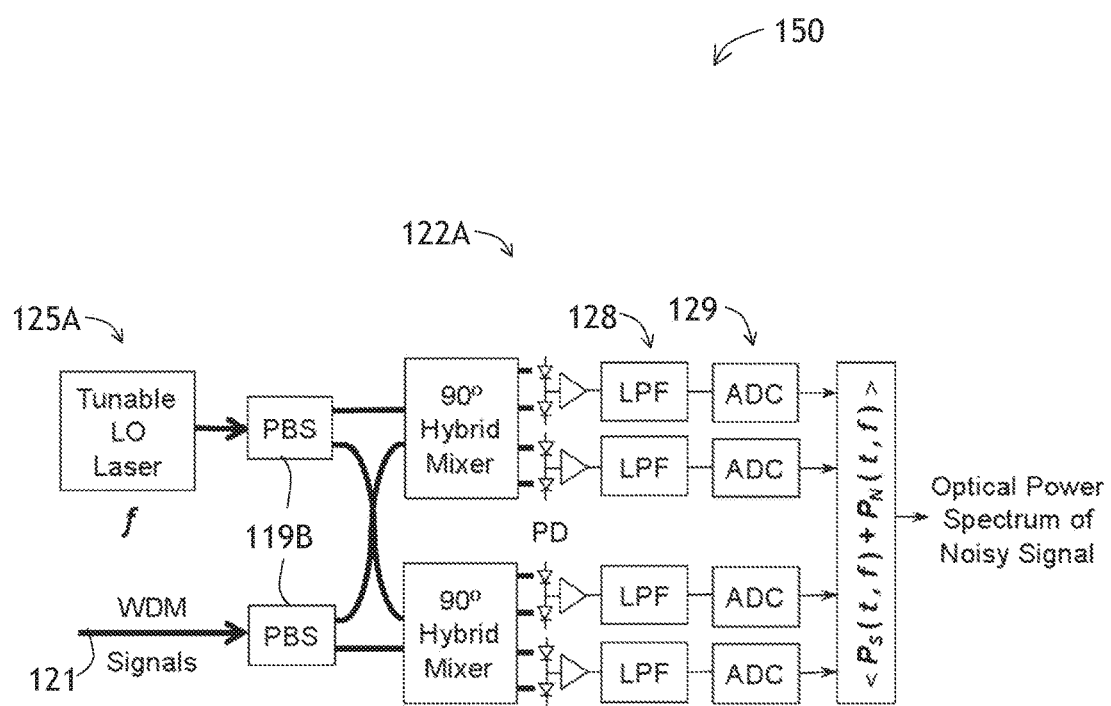
FIG. 15 is a schematic illustration of an apparatus for measuring the optical power spectrum of the noisy signal, using a coherent receiver with continuously tunable LO laser.

The embodiment of FIG. 12 may also be used to measure a power spectrum of the noisy signal (c.f. FIG. 3). This measurement is illustrated in FIG. 15. In an apparatus 150, only one of the two coherent receiver channels 122A, 122B is needed e.g. 122A, including elements similar to those described above with reference to FIG. 12. The desired power spectrum may be obtained by scanning the LO laser 125A over the entire bandwidth of the signal 121, while recording the inner product of the Jones vector, i.e. $|X_T(t,f)|^2$, as shown schematically in FIG. 15. Time-varying optical power levels of the first and second portions of the modulated optical signal 121 are used instead of the time-varying optical amplitudes and phases.

Figure 16:
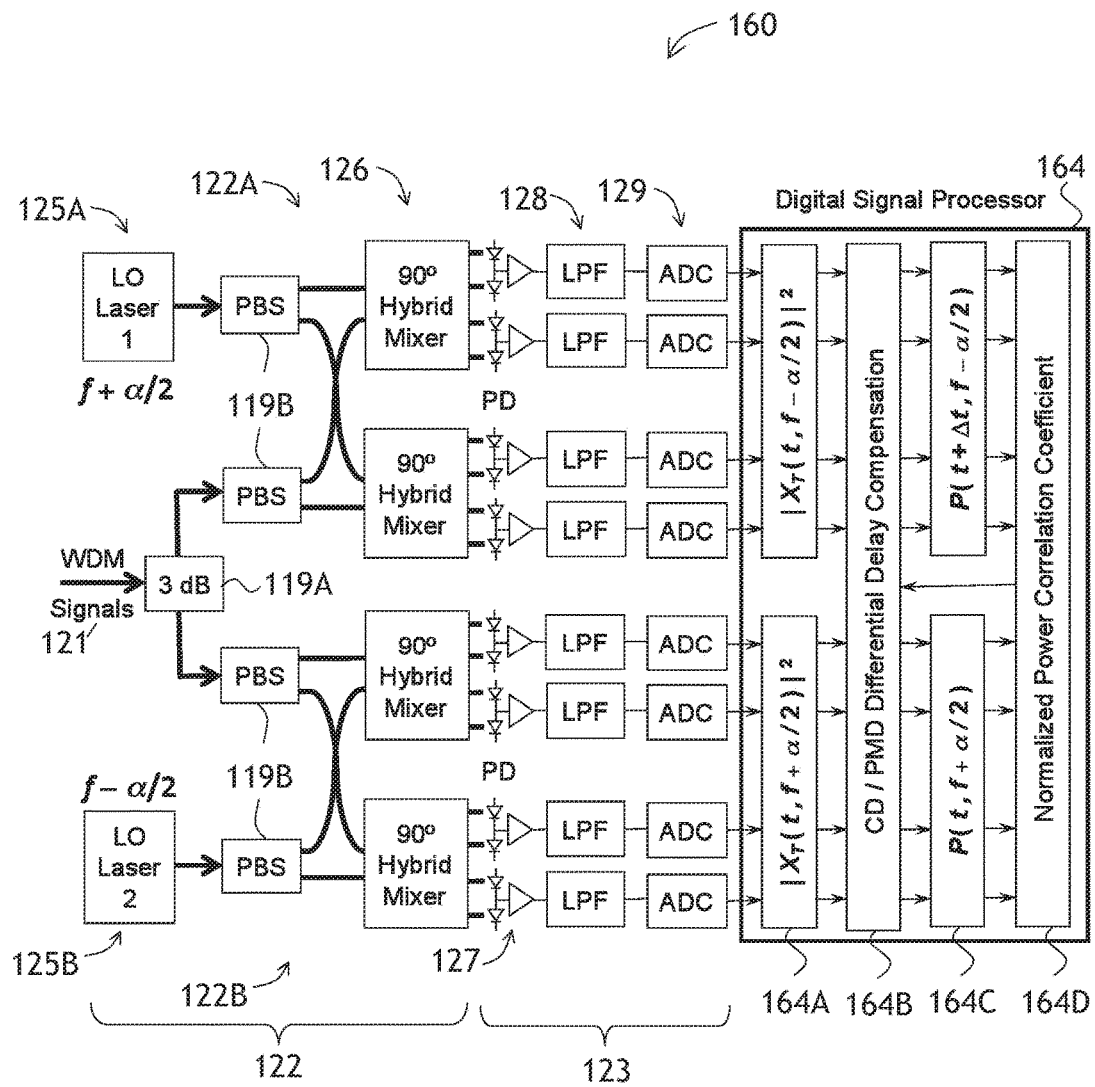
FIG. 16 is a schematic illustration of an apparatus for measuring intensity correlations in the spectrum of a modulated signal, using two parallel coherent receivers with phase and polarization diversity and fast digital signal processing.

FIG. 16 displays a schematic diagram of an apparatus 160 for the above described in-band OSNR measurements using the power SCDF of the optical signal. Similarly to the apparatus 120 of FIG. 12, the apparatus 160 of FIG. 16 has two parallel coherent receiver channels 122A, 122B, which are connected to a fast DSP 164. One difference is that the DSP in FIG. 16 uses modules 164C, 164D to calculate the correlation between the time-varying powers of the two Jones vectors 164A, i.e.

$$\tilde{P}(t, f \pm \alpha/2) = |\tilde{X}_T(t, f \pm \alpha/2)|^2$$
$$= \beta^2 [|i_1(t, f \pm \alpha/2)|^2 + |i_2(t, f \pm \alpha/2)|^2 +$$
$$|i_3(t, f \pm \alpha/2)|^2 + |i_4(t, f \pm \alpha/2)|^2].$$

The requirements for the electrical bandwidth of the receiver are identical to those described above for measurements of the amplitude SCDF (c.f. FIG. 13).

Prior to calculating the power SCDF, any undesired differential time delays between the two signal powers $\tilde{P}(t, f-\alpha/2)$ and $\tilde{P}(t, f+\alpha/2)$ may need to be removed by digital signal processing, as described above, including delays introduced by CD and PMD as well as those introduced in the receiver. This differential time delay compensation may be accomplished iteratively by means of a feedback loop, in which the delay is varied in sufficiently small steps until the power SCDF reaches a maximum. The differential time delay compensation is performed by a module 164B.

Figure 17:
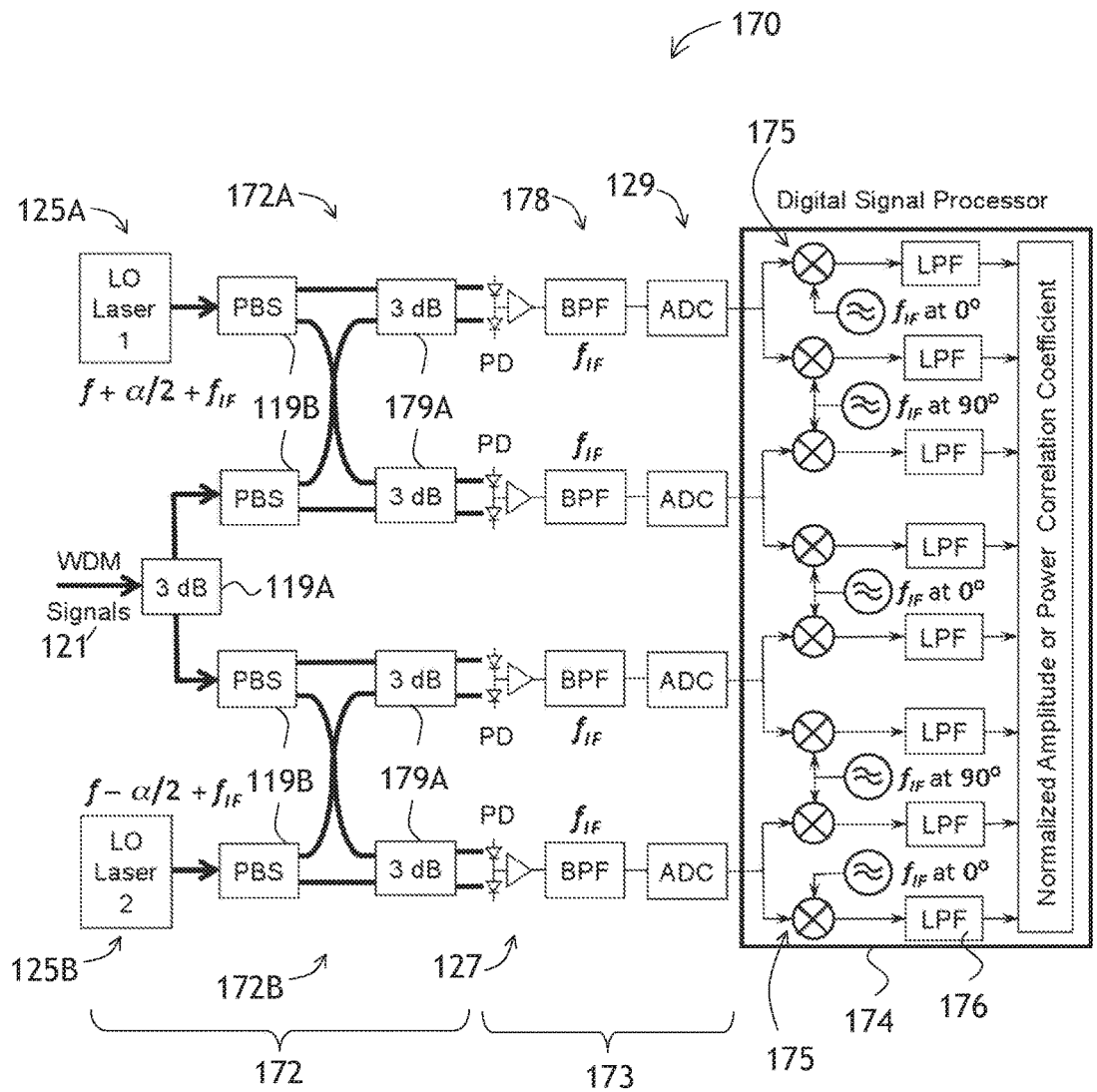
FIG. 17 is a schematic illustration of another apparatus embodiment for measuring amplitude or intensity correlations in the optical spectrum of a modulated signal, using two parallel heterodyne receivers with polarization diversity and digital down-conversion with phase diversity in a digital signal processor.

Turning now to FIG. 17, an apparatus 170 may be used for measuring spectral correlations in power level or amplitude of the signal 121. Just like the embodiments of apparatus 120 of FIG. 12 and 160 of FIG. 16, the apparatus 170 of FIG. 17 includes a frequency selective splitter 172 including two parallel coherent receivers, or receiver channels 172A, 172B; and a measuring unit 173 to measure correlations between two distinct frequency components of the optical amplitude or power of the signal 121. Unlike the homodyne receivers used in the apparatus 120 of FIG. 12 and 160 of FIG. 16, the apparatus 170 of FIG. 17 uses two heterodyne receivers, in which the frequencies of the two LO lasers 125A and 125B are offset from f−α/2 and f+α/2 by an equal amount $f_{IF}$, which is substantially larger than the bandwidth of the signals from which the amplitude or power SCDF is calculated. As a result, the spectral components to be analyzed are found at intermediate frequency $f_{IF}$ in the receiver photo currents generated by the coherent mixer and, hence, can be selected by means of electrical band-pass filters (BPF) 178 having a pass band centered around $f_{IF}$. Advantageously, such heterodyne receivers do not require coherent mixers with phase diversity, i.e. they do not require 90° hybrid mixers, but instead may use simple 3 dB optical couplers 179A to superimpose the optical signal with the output light of the LO lasers 125A, 125B, yielding only two photo currents in each of the two coherent receivers 172A, 172B.

The four signals needed to form the Jones vectors $\tilde{X}_T(t, f\pm\alpha/2)$ in each of the two coherent receivers 172A, 172B can be recovered by down-converting the two bandpass-filtered photocurrents by means of an electrical homodyne receiver to the baseband. Advantageously, this down-conversion and subsequent electrical filtering may be accomplished by digital signal processing in a DSP 174, as shown schematically in FIG. 17, using digital signal mixers 175 and digital low-pass filters 176. However, such digital down-conversion requires that the sampling rate of the ADCs 129 is substantially larger than 2 $f_{IF}$.

Figure 18:
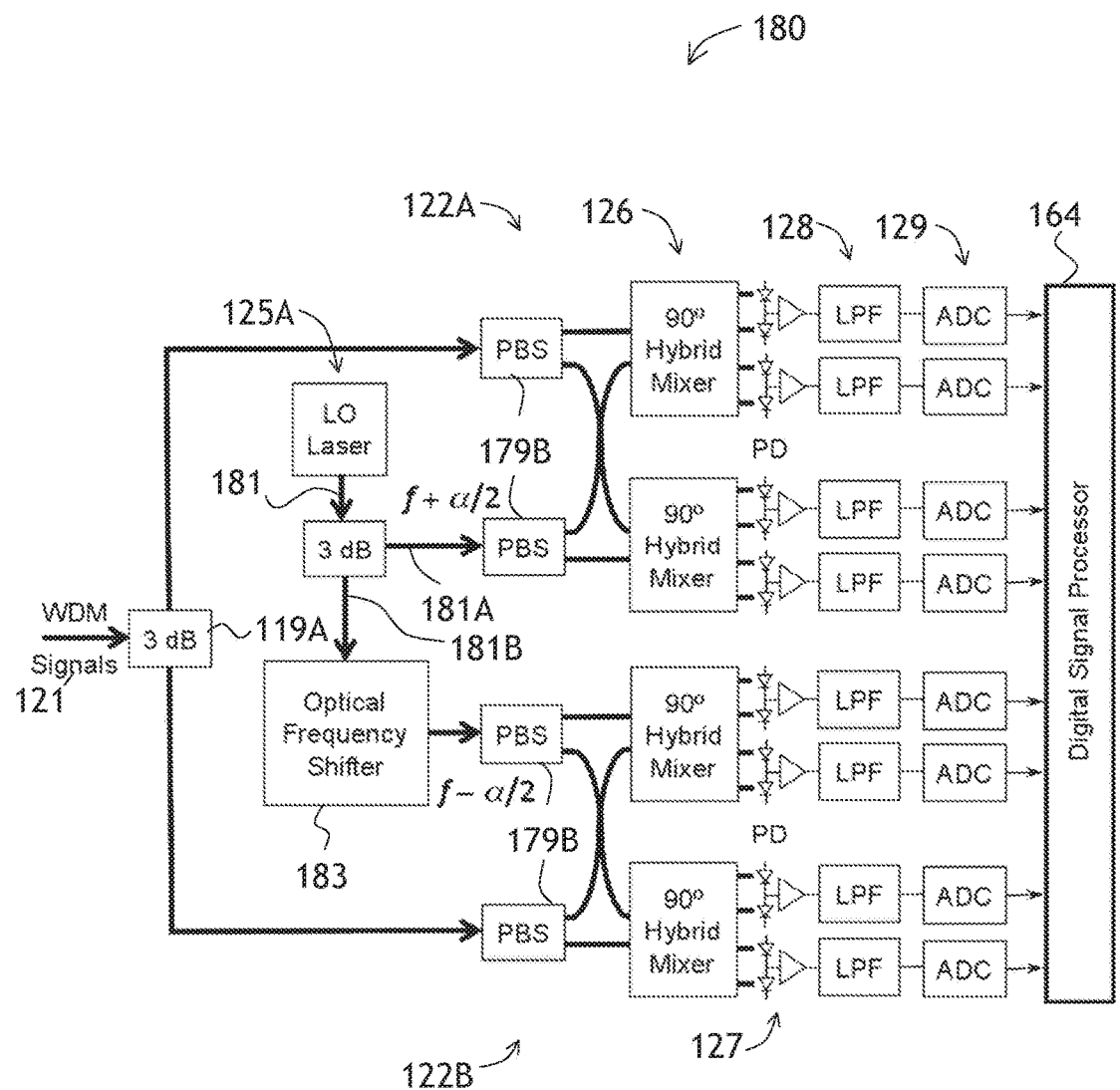
FIG. 18 is a schematic illustration of another apparatus embodiment for measuring amplitude or intensity correlations in the optical spectrum of a modulated signal, using two parallel coherent receivers and a single laser in combination with an optical frequency shifter to generate the two optical local oscillator signals spaced apart in frequency.

In another embodiment, the two independent LO lasers 125A, 125B for the two receivers 172A, 172B may be replaced by a single laser and an optical frequency shifter. Referring now to FIG. 18, an apparatus 180 is similar to the apparatus 160 of FIG. 16. In the apparatus 180 of FIG. 18, output light 181 of the LO laser 125A is equally split into two signals 181A and 181B, of which the first signal 181A serves as the LO signal for the first coherent receiver channel 122A, whereas the second signal 181B is shifted in frequency by an amount substantially equal to α by means of an optical frequency shifter 183, to generate a LO optical signal for the second coherent receiver channel 122B.

The advantage of using the single LO laser 125A for both coherent mixer pairs 126 is that it substantially reduces the frequency stability requirements for the LO laser 125A, provided that optical path lengths for the modulated signal between the 3 dB splitter 119A and the four inputs to the 90° hybrid mixers 126 are substantially equal and, likewise, that the optical path lengths for the two LO signals between the 3 dB splitter 179B and the four inputs to the 90° hybrid mixers 126 are substantially equal. Another advantage of this embodiment is that the frequency difference between the two LO signals is determined by the frequency offset generated in the optical frequency shifter 183, which may be set with much higher accuracy than the difference frequency of two independent LO lasers 125A and 125B in FIGS. 12 and 16.

Figure 19A:
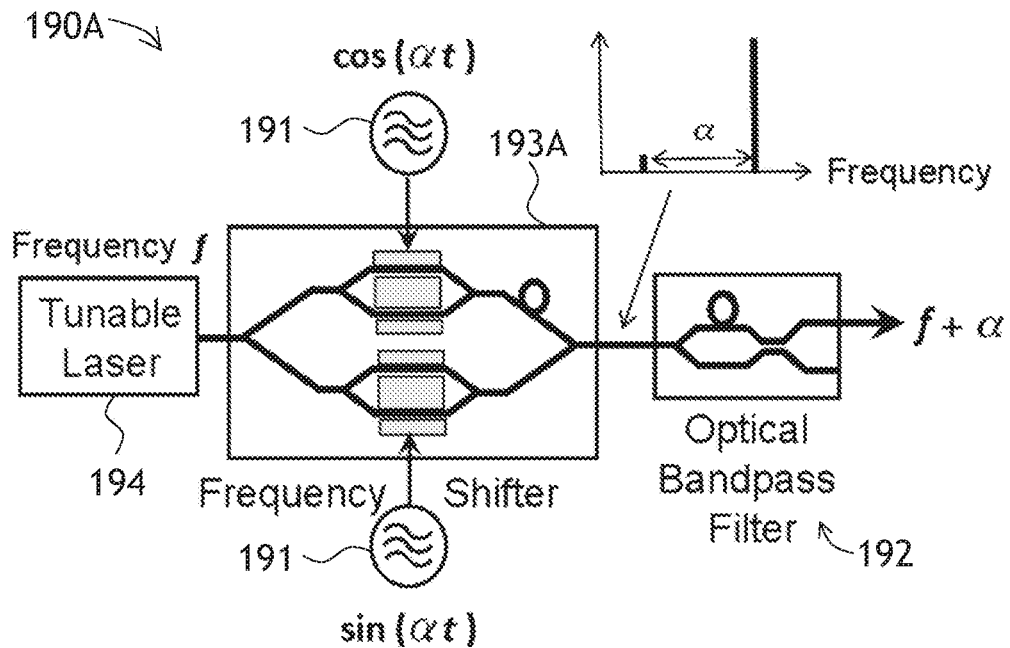
FIGS. 19A-19C are schematic illustrations of three exemplary embodiments of optical frequency shifters for generating one or two frequency shifted optical signals from a single-frequency optical input signal.

Referring to FIG. 19A, an electro-optic frequency shifter 190A has been described in detail by M. Izutsu et al. in "Integrated optical SSB modulator/frequency shifter," *J. Quantum Electron.* Vol. 17, p. 2225 (1981), incorporated herein by reference, and will only be briefly described herein. The electro-optic frequency shifter 190A includes an optical modulator 193A coupled to a tunable laser source 194. The frequency offset, or the modulation frequency α is determined by the electrical frequency of an sinusoidal oscillator 191 outputting two signals of identical frequency that are phase-shifted by 90°. The optical output signal of the frequency shifter 190A is filtered by an optical band-pass filter 192, as shown in FIG. 19A, to filter out other undesired frequency components, i.e. harmonics of the modulation frequency α.

Figure 19B:
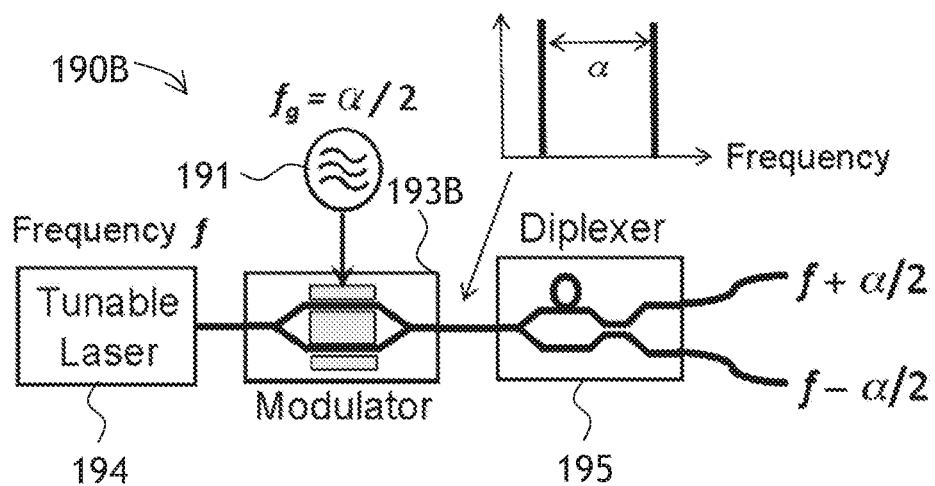
Figure 19C:
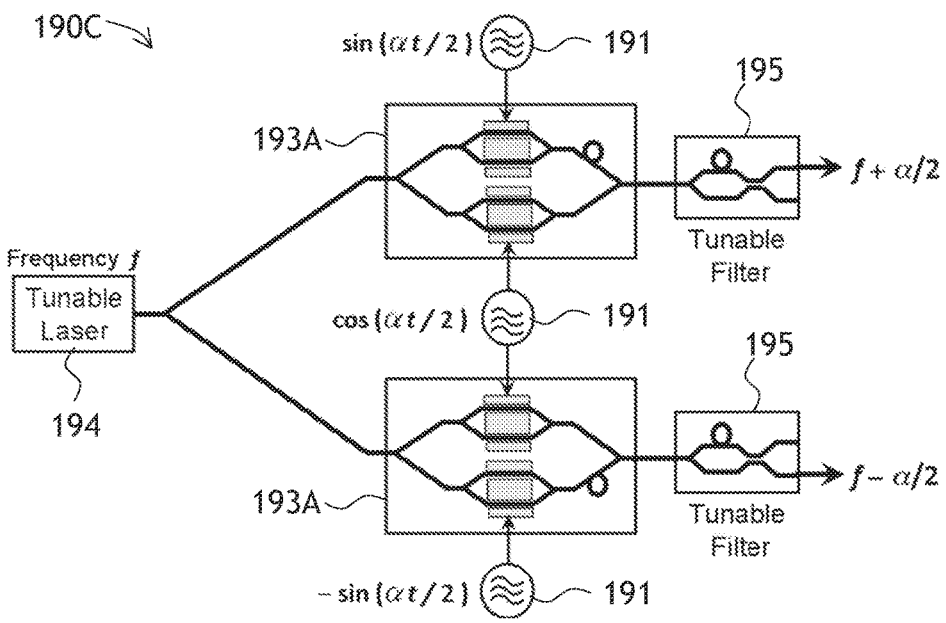

Turning to FIGS. 19B and 19C, electro-optic frequency shifters 190B and 190C both generate two shifted optical frequency components from a single optical input signal provided by the tunable laser 194. The frequency shifter 190B of FIG. 19B includes a Mach-Zehnder modulator 193B driven by the sinusoidal oscillator 191 with a sinusoidal signal of frequency α/2, and operated in such a way that it generates a carrier-suppressed optical line spectrum, as disclosed by F. Heismann et al. in U.S. Pat. No. 8,135,275 issued Mar. 13, 2012 "Measuring chromatic dispersion in an optical wavelength channel of an optical fiber link", incorporated herein by reference. The two main frequency components in the output of the Mach-Zehnder modulator at frequencies f−α/2 and f+α/2 may be separated from each other and the other undesired frequency components by an optical diplexer 195.

The frequency shifter 190C shown in FIG. 19C has two identical optical modulators 193A of the kind shown in FIG. 19A and, in general, generates fewer undesired frequency components that the frequency shifter shown in FIG. 19B. However, it has substantially higher optical insertion loss than the simpler frequency shifter 190B of FIG. 19B.

Figure 20:
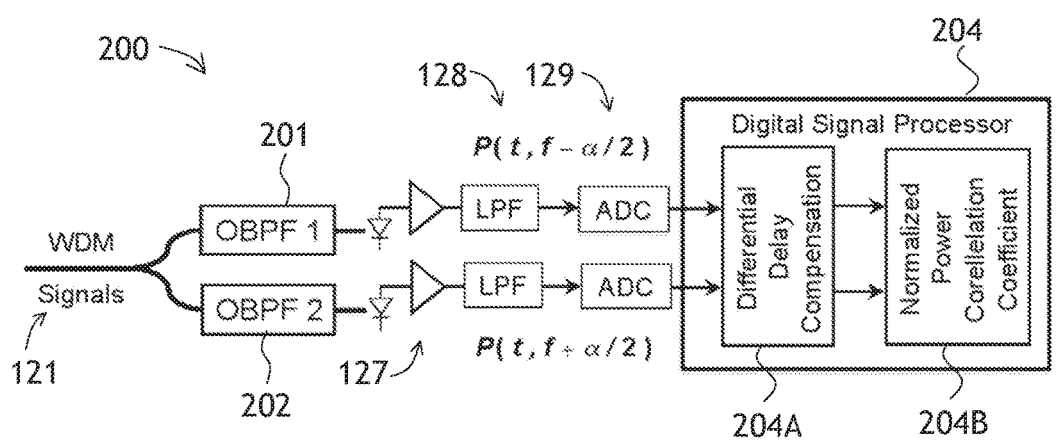
FIG. 20 is a schematic illustration of an apparatus embodiment for measuring intensity correlations in the optical spectrum of a modulated signal using two narrow-band optical band-pass filters and non-coherent photo-receivers.

Turning now to FIG. 20, another embodiment of an apparatus 200 for measuring correlations in the signal's optical power spectrum is shown. The apparatus 200 includes two narrowband optical band-pass filters, 201 (OBPF1) and 202 (OBPF2), for selecting spectral components to be analyzed, two photodetectors 127, two LPFs 128, and two ADCs 129. In operation, optical power levels of the two spectral components filtered by the OBPF1 201 and OBPF2 202, are detected by the photodetectors 127, filtered by the LPFs 128, and digitized by the ADCs 129. A processing unit 204 performs differential group delay compensation (module 204A) and then calculates a normalized power correlation coefficient (module 204B).

The apparatus 200 is substantially simpler than the apparatus 160 of FIG. 16, but the apparatus 200 requires OBPFs with a 3-dB optical bandwidth of less than 1 GHz. Furthermore, the OBPF1 201 and OBPF2 202 shall not exhibit significant polarization dependence, such as polarization-dependent loss or polarization-dependent shifts of the optical passband.

Figure 21:
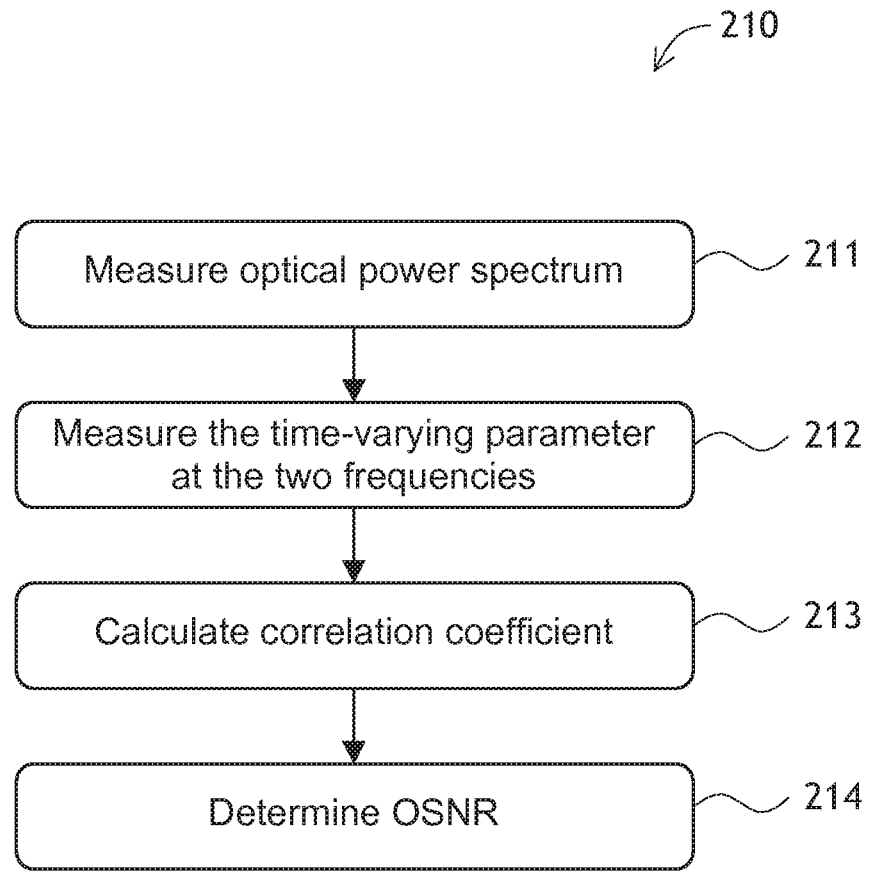
FIG. 21 illustrates a flow chart of a method for determining an optical signal-to-noise ratio of a modulated optical signal.

Exemplary methods for determining OSNR and other signal degradation parameters of a modulated optical signal, e.g. the WDM/DWDM signal 121 of FIG. 12, will now be briefly described. Referring to FIG. 21, a method 210 for determining an OSNR of a modulated optical signal propagating in a transmission link is presented. In a step 211, an optical power spectrum of the modulated optical signal is measured. The optical power spectrum includes at least one of the plurality of wavelength channels. In a following step 212, a time-varying parameter is measured during a measurement time. As explained above, the time-varying parameter may include at least one of: time-varying optical signal amplitudes and phases in two mutually orthogonal polarization states; and time-varying optical signal intensities in two mutually orthogonal polarization states. The time-varying parameter is measured simultaneously at first and second predetermined optical frequencies in a selected one of the plurality of wavelength channels. The first and second predetermined optical frequencies are separated by a non-zero frequency interval.

In a following step 213, a correlation between the time-varying parameters measured in the previous step 212 at the first and second optical frequencies is determined. The correlation is determined by calculating a correlation coefficient between the time-varying parameters at the first and second optical frequencies. The correlation coefficient is preferably normalized. In a following step 214, the OSNR is determined based on the optical power spectrum measured in the first step 211 and the correlation coefficient calculated in the third step 213. The measurement time of the measuring step 212 is preferably sufficiently long to reach a pre-determined level of fidelity (e.g. 90%) of the obtained correlation coefficient.

The correlation determining step 213 may include at least one of: removing differential phase and time delays introduced by chromatic dispersion in the transmission link between the time-varying parameters at the first and second optical frequencies; and removing a differential group delay introduced by polarization mode dispersion in the transmission link between the time-varying parameters at the first and second optical frequencies, as explained above.

Figure 22:
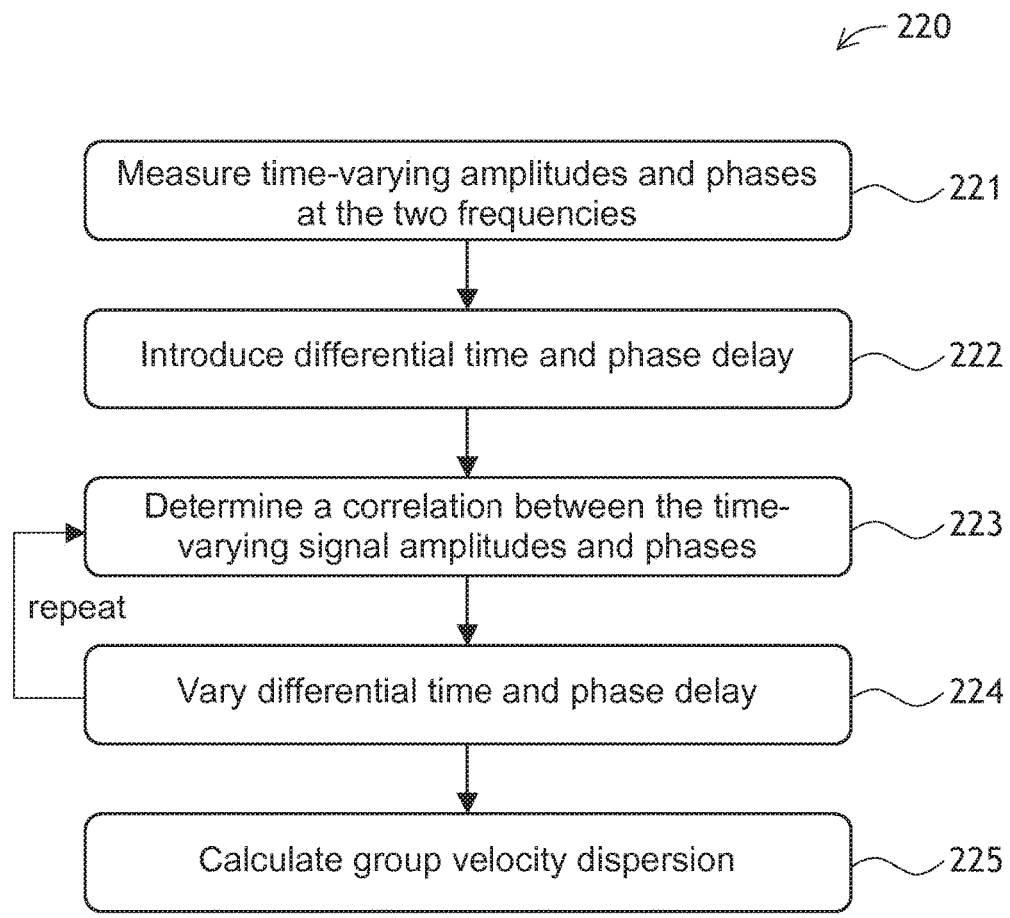
FIG. 22 illustrates a flow chart of a method for determining a group velocity dispersion accumulated due to chromatic dispersion of a modulated optical signal.

Turning to FIG. 22, a method 220 for determining a group velocity dispersion accumulated due to chromatic dispersion of a modulated optical signal, e.g. the WDM/DWDM signal 121, is presented. The method 220 includes a step 221 of measuring, during a measurement time, time-varying amplitudes and phases of the modulated optical signal in two mutually orthogonal polarization states simultaneously at first and second predetermined optical frequencies separated by a non-zero frequency interval, in at least one of the plurality of wavelength channels. In a next step 222, a differential time and phase delay is introduced between the signals representing time-varying optical signal amplitudes and phases at the first and second optical frequencies. In a next step 223, a correlation between the time-varying optical signal amplitudes and phases at the predetermined optical frequencies is determined, by calculating a correlation coefficient between the time-varying amplitudes and phases of the modulated optical signal. In a next step 224, the differential time and phase delay of the second step 222 is varied.

The two last steps 223 and 224 are repeated until the correlation coefficient reaches a maximum, and in a step 225, the group velocity dispersion is calculated from the differential time and phase delay introduced in the second step 222 and varied in the fourth step 224, and the frequency interval of the first step 221. Similarly to the previous method 210, the measurement time of the measuring step 221 is preferably sufficiently long to reach a pre-determined level of fidelity (e.g. 90%) of the calculated correlation coefficient.

Figure 23:
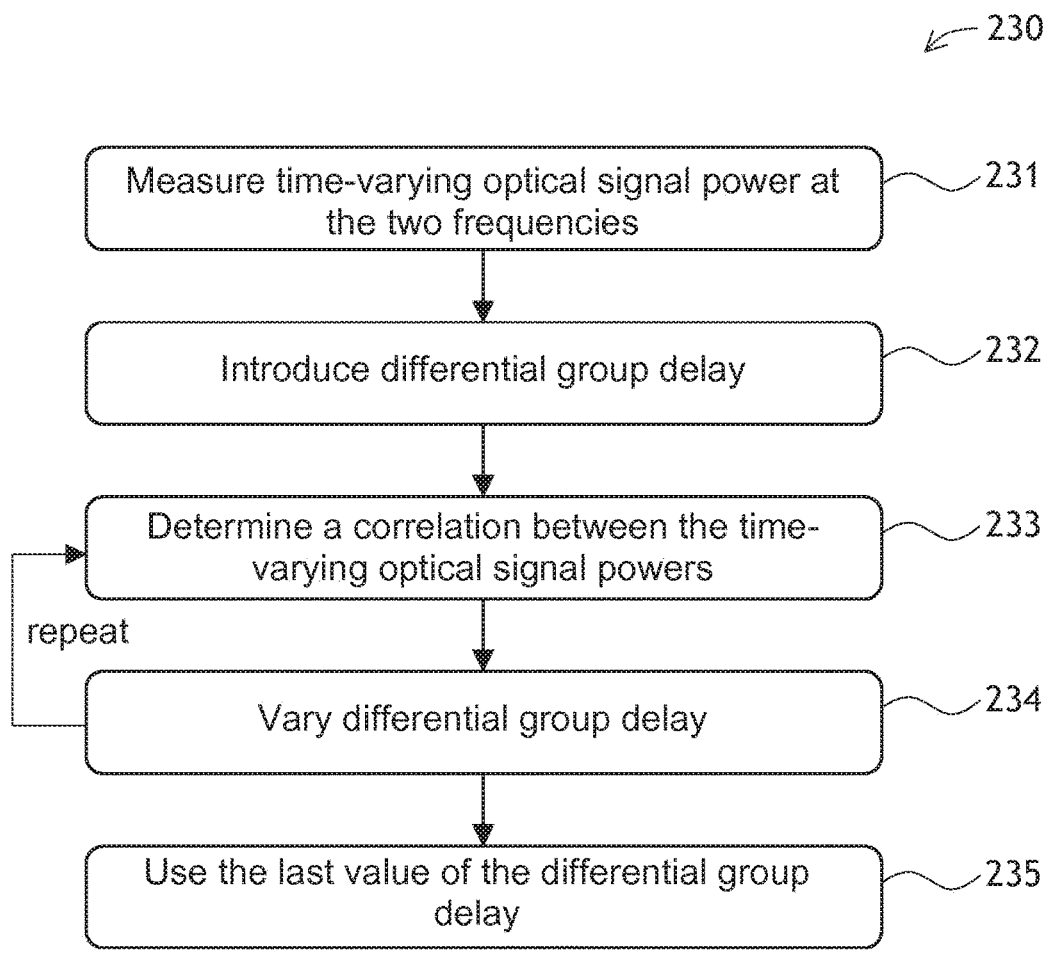
FIG. 23 illustrates a flow chart of a method for determining a differential group delay accumulated due to polarization mode dispersion of a modulated optical signal.

Referring now to FIG. 23, a method 230 for determining a differential group delay accumulated due to polarization mode dispersion of a modulated optical signal, e.g. the WDM/DWDM signal 121, is presented. The method 230 includes a step 231 of measuring, during a measurement time, time-varying optical signal power levels of the modulated optical signal in two mutually orthogonal polarization states simultaneously at first and second predetermined optical frequencies separated by a non-zero frequency interval, in at least one of the plurality of wavelength channels. In a next step 232, a differential group delay is introduced between the signals representing the time-varying optical signal powers at the first and second optical frequencies. In a next step 233, a correlation is determined between the time-varying optical signal powers at the first and second optical frequencies, by calculating a correlation coefficient between the time-varying optical signal powers. In a next step 234, the differential group delay of the second step 232 is varied. The two last steps 233 and 234 are repeated until the correlation coefficient reaches a maximum. The last iterated value of the differential group delay is used to obtain the differential group delay accumulated due to polarization mode dispersion of the modulated optical signal. Similarly to the previous method 220, the measurement time of the measuring step 231 is preferably sufficiently long to reach a pre-determined level of fidelity (e.g. 90%) of the computed correlation coefficient.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for determining a group velocity dispersion accumulated due to chromatic dispersion of a modulated optical signal comprising a plurality of wavelength channels, the method comprising:

measuring time-varying amplitudes and phases of the modulated optical signal in two mutually orthogonal polarization states simultaneously at first and second predetermined optical frequencies separated by a non-zero frequency interval, in at least one of the plurality of wavelength channels;

introducing a differential time and phase delay between signals representing the time-varying optical signal amplitudes and phases at the first and second optical frequencies;

determining a correlation between the time-varying optical signal amplitudes and phases at the predetermined optical frequencies by calculating a correlation coefficient between the time-varying amplitudes and phases of the modulated optical signal;

varying the differential time and phase delay;

determining the correlation between the time-varying optical signal amplitudes and phases at the predetermined optical frequencies and varying the differential time and phase delay until the correlation coefficient reaches a maximum; and calculating the group velocity dispersion from the differential time and phase delay.

2. The method according to claim 1, wherein the frequency interval is substantially equal to a symbol repetition frequency of the modulated optical signal in the selected wavelength channel, or an integer multiple thereof.

3. The method according to claim 1, wherein differences between each of the first and second optical frequencies and a carrier frequency of the modulated optical signal in the selected wavelength channel are substantially of equal magnitude.

4. The method according to claim 1, determining a correlation between the time-varying parameters measured for the first and second optical frequencies based on at least one of:

removing differential phase and time delays introduced by chromatic dispersion in the transmission link between the time-varying parameters at the first and second optical frequencies; and removing the differential group delay.

5. A method for determining a differential group delay accumulated due to polarization mode dispersion of a modulated optical signal comprising a plurality of wavelength channels, the method comprising:

measuring time-varying optical signal power of the modulated optical signal in two mutually orthogonal polarization states simultaneously at first and second predetermined optical frequencies separated by a non-zero frequency interval, in at least one of the plurality of wavelength channels;

introducing a differential group delay between signals representing the time-varying optical signal powers at the first and second optical frequencies;

determining a correlation between the time-varying optical signal powers at the first and second optical frequencies by calculating a correlation coefficient between the time-varying optical signal powers;

varying the differential group delay;

determining a correlation between the time-varying optical signal powers at the first and second optical frequencies and varying the differential group delay until the correlation coefficient reaches a maximum; and using the last value of the differential group delay varied to obtain the differential group delay accumulated due to polarization mode dispersion of the modulated optical signal.

6. The method according to claim 5, wherein the frequency interval is substantially equal to a symbol repetition frequency of the modulated optical signal in the selected wavelength channel, or an integer multiple thereof.

7. The method according to claim 5, wherein differences between each of the first and second optical frequencies and a carrier frequency of the modulated optical signal in the selected wavelength channel are substantially of equal magnitude.

8. The method according to claim 5, determining a correlation between the time-varying parameters measured for the first and second optical frequencies based on at least one of:

removing differential phase and time delays introduced by chromatic dispersion in the transmission link between the time-varying parameters at the first and second optical frequencies; and removing the differential group delay.

* * * * *